US012250544B2

(12) United States Patent
Faccin et al.

(10) Patent No.: US 12,250,544 B2
(45) Date of Patent: Mar. 11, 2025

(54) TECHNIQUES FOR IDENTIFYING AERIAL VEHICLES IN MOBILE NETWORKS

(71) Applicant: QUALCOMM Incorporated, San Diego, CA (US)

(72) Inventors: Stefano Faccin, San Ysidro, CA (US); Anand Palanigounder, San Diego, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 17/141,051

(22) Filed: Jan. 4, 2021

(65) Prior Publication Data

US 2021/0206492 A1 Jul. 8, 2021

Related U.S. Application Data

(60) Provisional application No. 62/957,784, filed on Jan. 6, 2020.

(51) Int. Cl.
*H04W 12/06* (2021.01)
*H04L 9/40* (2022.01)
*H04W 12/069* (2021.01)

(52) U.S. Cl.
CPC ....... *H04W 12/069* (2021.01); *H04L 63/0823* (2013.01)

(58) Field of Classification Search
CPC .. G08G 5/0069; G08G 5/0013; G08G 5/0026; G08G 5/006; H04L 63/0823;
(Continued)

(56) References Cited

U.S. PATENT DOCUMENTS 2,018,035 A * 10/1935 Roth .................. F23N 3/08
251/249.5
9,294,286 B2 * 3/2016 Krywaniuk ............ H04L 41/00
(Continued)

FOREIGN PATENT DOCUMENTS

CN 107408351 A 11/2017
EP 3671694 A1 6/2020
(Continued)

OTHER PUBLICATIONS

Yapp et al., 2016 IEEE/AIAA 35th Digital Avionics Systems Conference (DASC), "UAV as a Service: Enabling On-Demand Access and On-The-Fly Re-tasking of Multi-Tenant UAVs Using Cloud Services", pp. 1-8 (Year: 2016).*
"3rd Generation Partnership Project, Technical Specification Group Services and System Aspects, Remote Identification of Unmanned Aerial Systems, Stage 1 (Release 16)", 3GPP Standard, Technical Report, 3GPP TR 22.825, 3rd Generation Partnership Project (3GPP), Sep. 21, 2018 (Sep. 21, 2018), pp. 1-22, section 5 .1. 3; p. 8.
(Continued)

*Primary Examiner* — Benjamin E Lanier
(74) *Attorney, Agent, or Firm* — Arun Swain

(57) ABSTRACT

Some aspects described herein relate to provisioning aerial vehicles with identifiers, certificates, or other credentials for communicating based on a mobile network. The UAV can transmit a request to register with the mobile network, where the request includes at least a hardware identifier of the UAV. The UAV may receive, from a component of the mobile network, a response to the request, where the response includes a unique UAV identifier, a UAV certificate, and a network certificate generated by at least one of the component of the mobile network or a unmanned aircraft system service supplier (USS).

30 Claims, 17 Drawing Sheets

(58) Field of Classification Search
CPC ... H04L 63/0876; H04L 63/062; H04L 67/12; H04W 12/069; H04W 4/44; H04W 4/021; H04W 12/043; H04B 7/18506
USPC .......................................................... 713/156
See application file for complete search history.

(56) References Cited

U.S. PATENT DOCUMENTS

| | | | |
|---|---|---|---|
| 10,981,306 B1* | 4/2021 | Weinstein | H04L 63/062 |
| 2016/0351043 A1* | 12/2016 | Tabe | H04N 21/4788 |
| 2018/0211263 A1 | 7/2018 | Gong et al. | |
| 2019/0174314 A1* | 6/2019 | Joseph | H04W 12/06 |
| 2020/0389788 A1* | 12/2020 | Smeets | H04W 12/04 |
| 2021/0092604 A1* | 3/2021 | Fox | H04L 9/3268 |
| 2022/0277657 A1* | 9/2022 | Xiang | H04W 12/68 |

FOREIGN PATENT DOCUMENTS

| | | | | |
|---|---|---|---|---|
| WO | WO-2011082636 A1 * | 7/2011 | ............. | H04W 4/70 |
| WO | 2019047066 A1 | 3/2019 | | |

OTHER PUBLICATIONS

International Search Report and Written Opinion—PCT/US2021/012189—ISA/EPO—Sep. 29, 2021.
Qualcomm Incorporated: "FS ID UAS-SA2: Solutions for Issues 1, 2 and 4", 3GPP Draft, SA WG2 Meeting #S2-136AH, S2-2000570, 3rd Generation Partnership Project (3GPP), South Korea, Jan. 7, 2020, Retrieved from the Internet: URL: https://ftp.3gpp.org/tsg_sa/WG2_Arch/TSGS2_136AH_Incheon/Docs/S2-2000570.zip. section 6.X.

* cited by examiner

TECHNIQUES FOR IDENTIFYING AERIAL VEHICLES IN MOBILE NETWORKS

CLAIM OF PRIORITY UNDER 35 U.S.C. § 119

The present application for patent claims priority to Provisional Patent Application No. 62/957,784, entitled "TECHNIQUES FOR IDENTIFYING AERIAL VEHICLES IN MOBILE NETWORKS" filed Jan. 6, 2020, which is assigned to the assignee hereof and hereby expressly incorporated by reference herein for all purposes.

BACKGROUND

Aspects of the present disclosure relate generally to wireless communication systems, and more particularly, to wireless communications involving aerial vehicles.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

Unmanned aerial vehicles (UAVs), such as drones, are also in-use and being developed. Different approaches are proposed for managing UAV traffic in the air space, and the approaches may be region specific (e.g., specific to a certain country). In some approaches, UAVs can broadcast a remote identifier (RID) that can include information such as an aircraft identifier (e.g., serial number, civil aviation agency assigned identifier, etc.), location information, operator identifier, etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for registering an unmanned aerial vehicle (UAV) in a mobile network. The method includes transmitting, by the UAV, a request to register with the mobile network, wherein the request includes at least a hardware identifier of the UAV, and receiving, from a component of the mobile network, a response to the request, wherein the response includes a unique UAV identifier, a UAV certificate, and a network certificate generated by at least one of the component of the mobile network or a unmanned aircraft system service supplier (USS).

In another example, a method for registering a UAV in a mobile network is provided. The method includes receiving, from the UAV, a request to register with the mobile network, wherein the request includes at least a hardware identifier of the UAV, and transmitting, to the UAV, a response to the request, wherein the response includes a unique UAV identifier, a UAV certificate, and a network certificate In a further example, an apparatus for wireless communication is provided that includes a memory configured to store instructions, and one or more processors communicatively coupled with the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

For example, an apparatus for registering a UAV in a mobile network is provided that includes a memory configured to store instructions, and one or more processors communicatively coupled with the memory. The one or more processors are configured to transmit a request to register with the mobile network, wherein the request includes at least a hardware identifier of the UAV, and receive, from a component of the mobile network, a response to the request, wherein the response includes a unique UAV identifier, a UAV certificate, and a network certificate generated by at least one of the component of the mobile network or a USS.

In another example, an apparatus for registering a UAV in a mobile network is provided that includes a memory configured to store instructions, and one or more processors communicatively coupled with the memory. The one or more processors are configured to receive, from the UAV, a request to register with the mobile network, wherein the request includes at least a hardware identifier of the UAV, and transmit, to the UAV, a response to the request, wherein the response includes a unique UAV identifier, a UAV certificate, and a network certificate.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
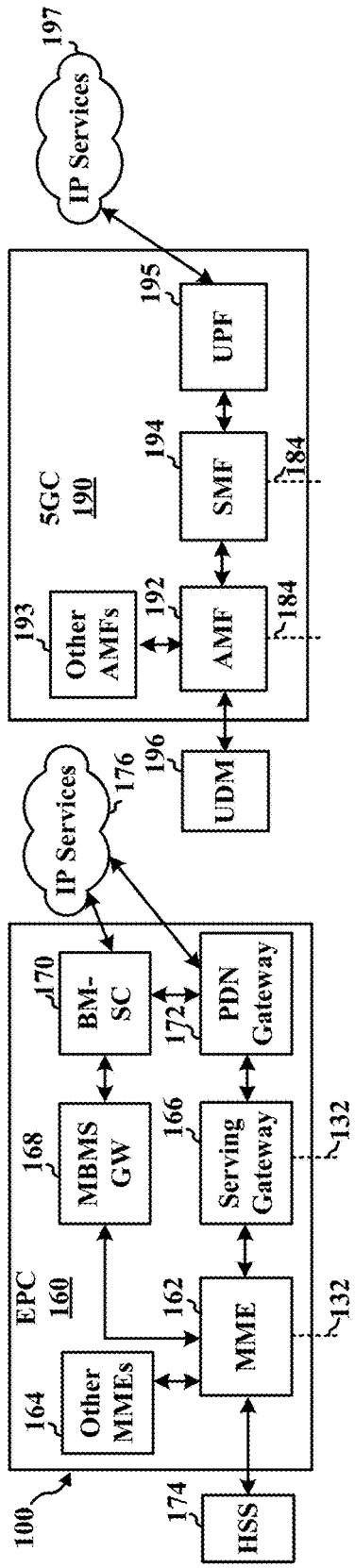
FIG. 1 illustrates an example of a wireless communication system, in accordance with various aspects of the present disclosure.
Figure 1:
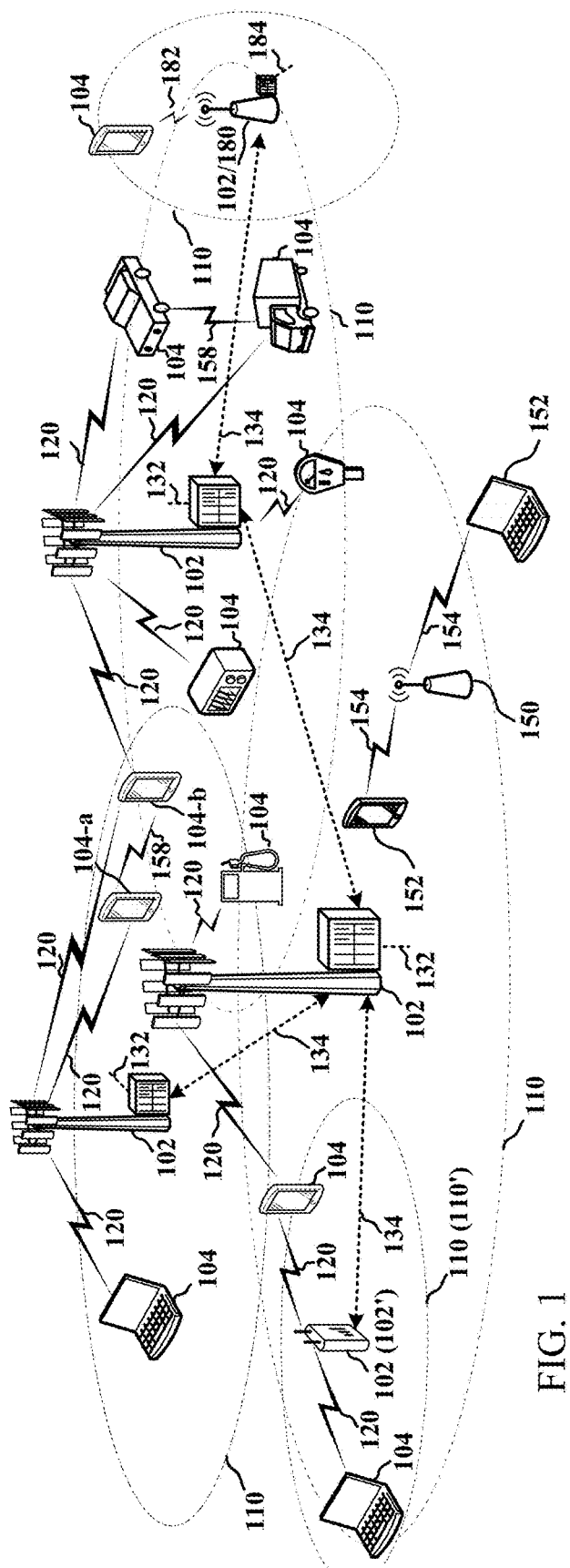

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing identities and/or credentials for aerial vehicles in mobile networks. For example, aerial vehicles can include mobile network subscriptions, and can use the mobile network to communicate certain information, such as an identity, flight information, etc. to other devices, network nodes in the mobile network or other networks, etc. In an example, an aerial vehicle can be equipped with a user equipment (UE) function or associated hardware to facilitate communicating in the mobile network. In addition, the aerial vehicle can be provisioned on the mobile network along with one or more identifiers, certificates, security keys, etc., as described further herein, to allow verifying or authenticating communications from/to the aerial vehicles via the mobile network. For example, an aerial vehicle can register with a component of the mobile network that can also communicate with components of an aerial vehicle network. Such components of the mobile network, for example, can facilitate identifier generation, certificate generation, etc., for providing an identifier, certificate, etc. to the aerial vehicle. The aerial vehicle can use the identifier, certificate, etc. in subsequent communications, where the communications can include communications via the mobile network or otherwise with the aerial network, communications directly with other aerial vehicles (e.g., with or without traversing a network), and/or the like to authenticate the communications.

In a specific example, aerial vehicles can include unmanned aircraft systems (UASs), which can include an unmanned aerial vehicle (UAV) and/or a corresponding operator. In this example, the mobile network can include a UAV flight control function (UFCF), such as via a node that provides the UFCF, that can interface with components of the aerial network, such as a UAS service supplier (USS) to facilitate communications between the UAV and aerial network via the mobile network. In this example, the UFCF can generate or provide the identifiers, certificates, etc. to the UAVs to facilitate securing, authenticating, etc. communications from the UAVs to the aerial network and/or to one another.

The described features will be presented in more detail below with reference to FIGS. 1-14.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100 (e.g., a mobile network). The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide quality-of-service (QoS) flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In one example, the term UE, as used herein (e.g., or UE 104) may refer to or include a UAV or may be part of a UAV, e.g., as hardware on the UAV or as a function provided by the UAV, as described further herein.

Figure 2:
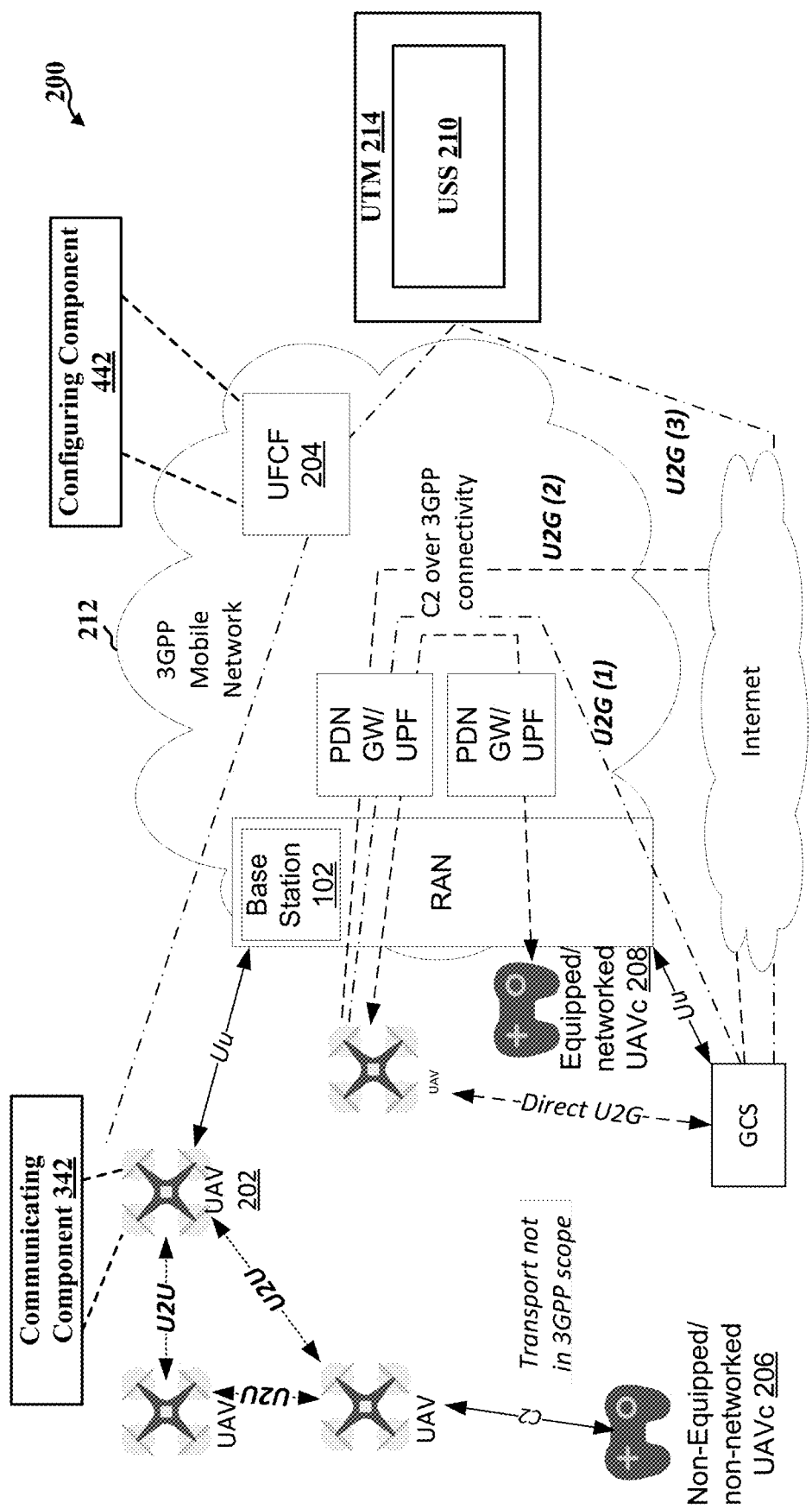
FIG. 2 illustrates an example of a wireless communication system that facilitates communicating with unmanned aircraft systems, in accordance with various aspects of the present disclosure.

FIG. 2 illustrates an example of a mobile network 200 for facilitating communications between multiple UASs, between a UAS and one or more aerial network (e.g., UAS network) components, etc. For example, a UAS can include one UAV controller (UAVc), such as a non-equipped/non-networked UAVc 206 or an equipped/networked UAVc 208, and one or more UAV(s) 202. UAVs 202 can be communicatively connected or coupled to one another over cellular connectivity (e.g., via mobile network, as described). In one example, a UAV 202 may be controlled by a UAV controller connected via the mobile network (e.g., a 3GPP mobile network 212). In another example, a UAV 202 may be controlled by a UAV controller not connected via the 3GPP mobile network 212 (e.g., using a C2 interface or another interface between the controller and UAV). A UAV controller 206, 208 connected via the 3GPP mobile network 212 may control one or more UAV(s), in an example. For instance, the UAV 202 can exchange application data traffic with a USS 210, which can be provided via a UAV traffic management (UTM) 214 component. In addition, for example, a UAV 202 can communicate with other UAV(s) using a UAV-2-UAV (U2U) interface, where the communications can include or otherwise correspond to Broadcast Remote ID. In another example, a UAV 202 can communicate with a ground control system (GCS) using a UAV-2-GCS (U2G) interface. A U2G interface may include one or more of (1) C2, where the GCS is a either a non-networked UAVc (shown as USG3) or a networked UAVc (shown as USG1/USG2), or (2) U2U, where the GCS monitors drones U2U to collect information. Direct U2G can correspond to C2, where the GCS is a non-networked UAVc, or U2U, where the GCS monitors drones U2U to collect information for identification. The UFCF 204, as described, can be a UAV Flight Control Function in the mobile network, which may be a mobile network operator (MNO) operated aerial function (AF) provided on a node of the MNO network. In addition, for example, some MNOs may provide the UFCF 204 functionality as USS to UAVs operations supported by the MNO. Other UAV fleets may be controlled by dedicated USS 210. A country can have multiple USSs 210. The "identity" assigned to the UAV for operation in a country can be unique in the country, as described further herein.

In addition, a UAV 202, and/or a corresponding UE 104 or UE 104 function, can include a communicating component 342 for facilitating provisioning the UAV 202 in a mobile network to receive an identifier, certificate, etc. for securing and/or authenticating communications with other UAVs and/or with aerial network components via the mobile network. In addition, the UFCF 204 can include a configuring component 442 for configuring a UAV 202 with an identifier, certificate, etc. for communicating with the other UAVs and/or with aerial network components via the mobile network.

Turning now to FIGS. 3-14, aspects are depicted with reference to one or more components and one or more methods that may perform the actions or operations described herein, where aspects in dashed line may be optional. Although the operations described below in FIGS. 5-13 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
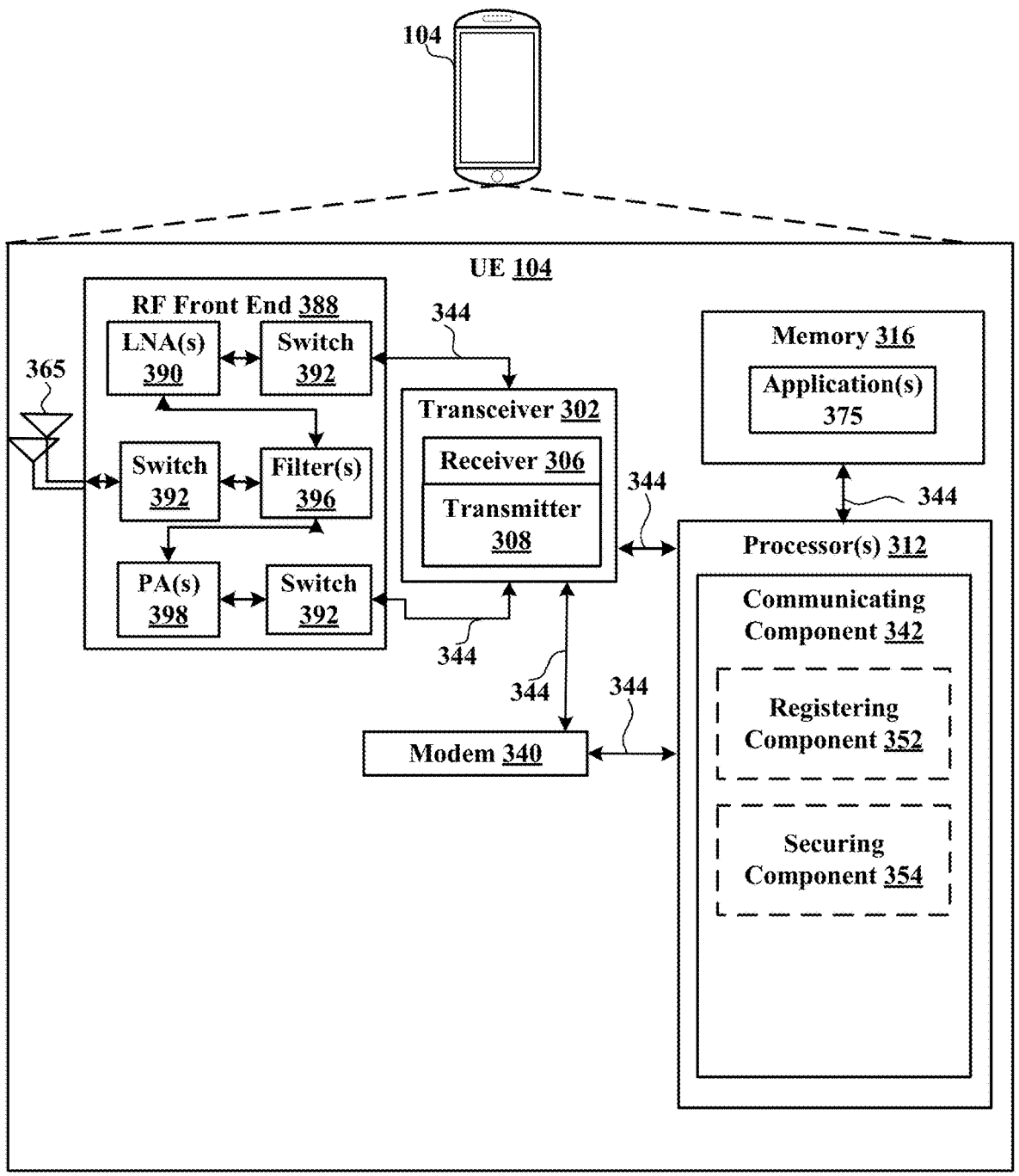
FIG. 3 is a block diagram illustrating an example of a UE, in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or communicating component 342 for registering with a mobile network to receive identifiers, certificates, etc. for communicating with other UEs or network components, as described herein. In addition, as described, UE 104 can be incorporated within, attached to, or otherwise communicatively coupled to or used by a UAV 202 to communicate with other UAVs, with aerial network components via a mobile network, etc. In an example, functionality described herein with respect to the UE 104 can be provided by or for a UAV 202 using an incorporated UE 104 or UE 104 function. In addition, for example, some of the hardware components of the UE 104 may be hardware components of the UAV 202 (e.g., used to operate other functions of the UAV 202). For example, the UE 104 of a UAV 202 may be configured to communicate with a base station 102 of a RAN for accessing a mobile network, as described herein, or to communicate directly with other UAVs (e.g., other UEs of other UAVs), etc.

In an aspect, the one or more processors 312 can include a modem 340 and/or can be part of the modem 340 that uses one or more modem processors. Thus, the various functions related to communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with communicating component 342 may be performed by transceiver 302.

Also, memory 316 may be configured to store data used herein and/or local versions of applications 375 or communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining communicating component 342 and/or one or more of its subcomponents, and/or data associated therewith, when UE 104 is operating at least one processor 312 to execute communicating component 342 and/or one or more of its subcomponents.

Transceiver 302 may include at least one receiver 306 and at least one transmitter 308. Receiver 306 may include hardware and/or software executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware and/or software executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 342 can optionally include a registering component 352 for registering with a mobile network, and/or a securing component 354 for securing communications with other UEs (e.g., UEs of other UAVs) or network components based on the registration, as described herein.

In an aspect, the processor(s) 312 may correspond to one or more of the processors described in connection with the UE in FIG. 14. Similarly, the memory 316 may correspond to the memory described in connection with the UE in FIG. 14.

Figure 4:
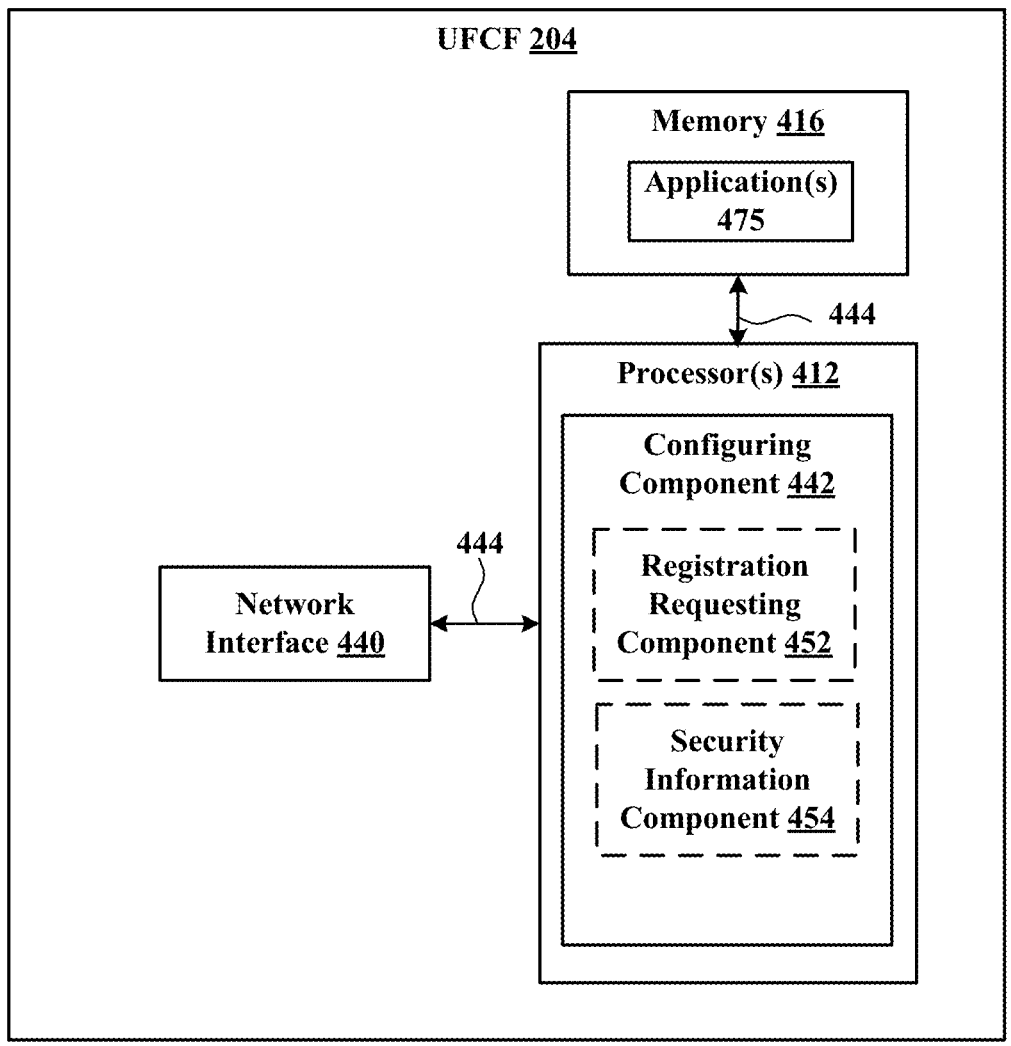
FIG. 4 is a block diagram illustrating an example of a unmanned aerial vehicle (UAV) flight and control function (UFCF), in accordance with various aspects of the present disclosure.

Referring to FIG. 4, one example of an implementation of a UFCF 204 may include a variety of components, some of which have already been described above, but including components such as one or more processors 412 and memory 416 in communication via one or more buses 444, which may operate in conjunction with network interface 440 and configuring component 442 for configuring UAVs with security information, such as one or more identifiers, certificates, etc. to utilize in communicating with other UAVs and/or aerial network components, as described herein. For example, UFCF 204 can communicate with other components of a mobile network or of an aerial network (e.g., USS) via the network interface 440.

In an aspect, configuring component 442 can optionally include a registration requesting component 452 for requesting registration of a UAV or one or more related identifiers from a USS or other aerial network component, and/or a security information component 454 for generating one or more identifiers, certificates, etc. for the UAV to use in communicating with other UAVs or aerial network components, as described herein.

Figure 5:
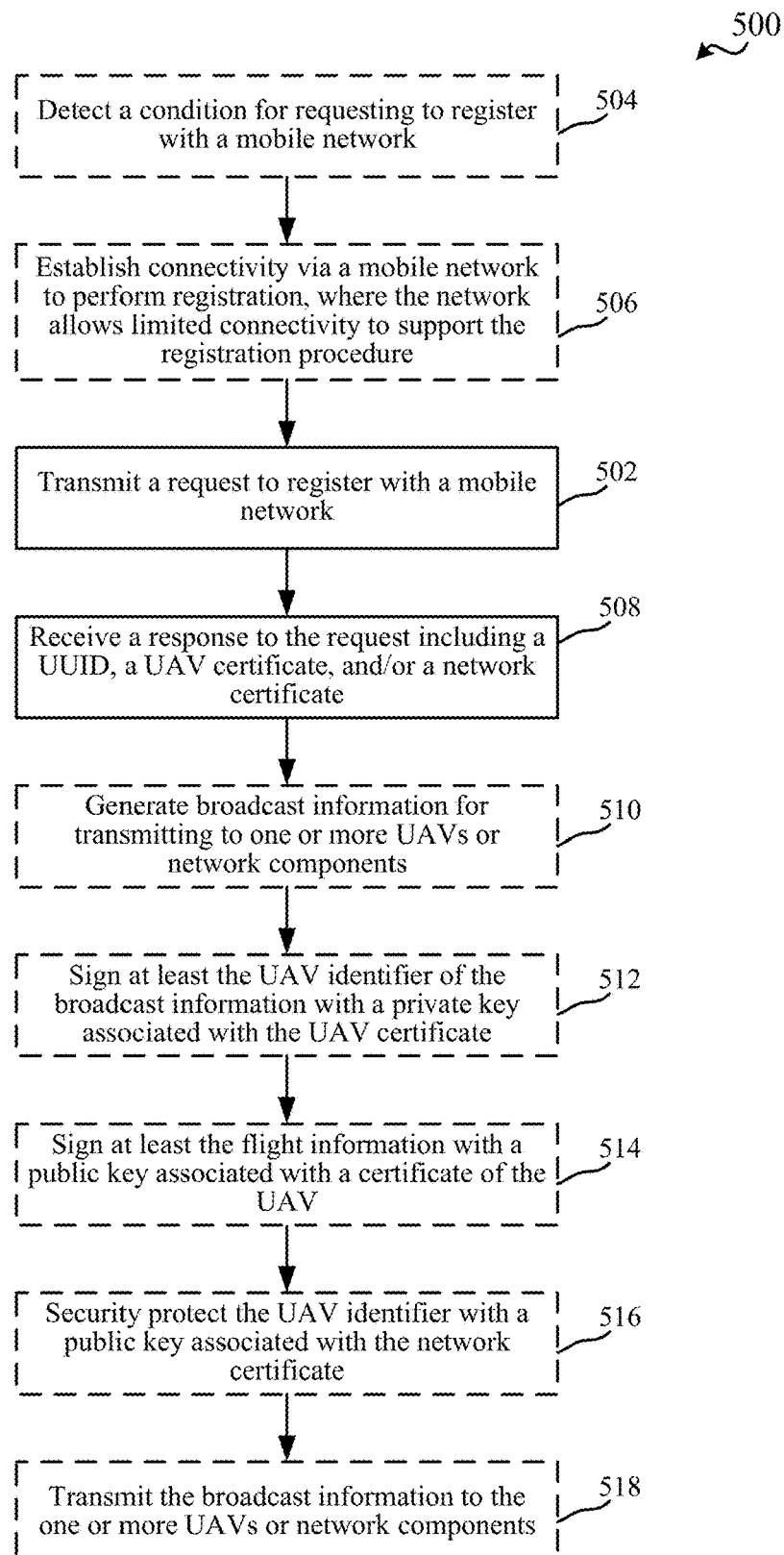
FIG. 5 is a flow chart illustrating an example of a method for obtaining and using mobile network credentials in UAV communications, in accordance with various aspects of the present disclosure.

FIG. 5 illustrates a flow chart of an example of a method 500 for provisioning and using security information with a mobile network. In an example, a UE (e.g., UE 104), which may include a UE or UE function of a UAV 202, can perform the functions described in method 500 using one or more of the components described in FIGS. 2 and 3.

In method 500, at Block 502, a request to register with a mobile network can be transmitted. In an aspect, registering component 352, e.g., in conjunction with processor(s) 312, memory 316, transceiver 302, communicating component 342, etc., can transmit the request to register with the mobile network. For example, registering component 352 can transmit the request to a mobile network component, such as a UFCF. In addition, communicating component 342 can transmit the request to the mobile network component via communications with a base station 102, which can be part of a RAN that provides access to the mobile network. For example, registering component 352 can transmit the request to the mobile network component based on detecting one or more triggers or events related to performing registration. Such triggers or events may include powering on of the UE 104 or UE function 104 of the UAV, detecting presence of the mobile network by monitoring for certain signals from a base station or other node of the mobile network, etc.

In an example, registering component 352 can generate the request to include a hardware identifier of an associated UAV, which may be signed by a hardware UAV certificate issued by the manufacturer of the UAV or the certificate of a manufacturer of the UAV. The request may also indicate an operator of the UAV, a pilot of the UAV, etc. using associated identifiers, and/or other information that may be relevant to determining whether to allow the UAV to communicate via the mobile network. The request may be protected using the private key associated with the hardware UAV certificate issued by the manufacturer of the UAV or the certificate of a manufacturer of the UAV.

In an example, in method 500, optionally at Block 504, a condition for requesting to register with the mobile network can be detected. In an aspect, registering component 352, e.g., in conjunction with processor(s) 312, memory 316, transceiver 302, communicating component 342, etc., can detect the condition for requesting the register with the mobile network. For example, the condition may relate to determining that the UE 104/UAV 202 does not have stored credentials for accessing the mobile network. In another example, the condition may relate to determining that the UE 104/UAV 202 is in a geographic area other than a home geographic area associated with the UE 104/UAV 202 (e.g., in another country). In another example, the condition may relate to an event or command received from an operator or pilot of the UAV 202 (e.g., via an interface of the UAV 202), etc. In other examples, as described, above, the condition may relate to the UAV 202 or associated UE 104 or UE 104 function powering on, detecting signals from a base station or other mobile network component.

In an example, in method 500, optionally at Block 506, connectivity via a mobile network can be established to perform registration, where the network allows limited connectivity to support the registration procedure. In an aspect, registering component 352, e.g., in conjunction with processor(s) 312, memory 316, transceiver 302, communicating component 342, etc., can establish connectivity via the mobile network to perform registration (e.g. using a specific data network name or access point name), where the network allows limited connectivity to support the registration procedure. For example, registering component 352 can connect to the MNO for UAV provisioning, and the network can allow limited connectivity to support the registration procedure (e.g. can allow connectivity only to the UFCF). In this example, registering component 352 may specify, in the registration request, in a request to establish connectivity, or in other communications after connectivity is established, a special access point name (APN)/data network name (DNN), or may communicate via a dedicated bearer in a generic packet data network (PDN) connection/protocol data unit (PDU) session with QoS and default traffic filters that only allow connectivity to the UFCF.

In method 500, at Block 508, a response to the request including a unique UAV identifier (UUID), a UAV certificate, and/or a network certificate can be received. In an aspect, registering component 352, e.g., in conjunction with processor(s) 312, memory 316, transceiver 302, communicating component 342, etc., can receive the response to the request including the UUID, the UAV certificate, and/or the network certificate. The network certificate can be a certificate that is issued by a Certificate Authority (CA) and is assigned to either the UFCF or the USS. For example, one or more of the parameters received in the response can be used for securing or authenticating subsequent communications transmitted to other UAVs or aerial network components.

In one example, the response can be signed using a private key associated with the network certificate, and registering component 352 can verify or authenticate the response using a public key of the network certificate (e.g., which may be a certificate associated with the UFCF or the USS), or the public key of the Certificate Authority associated with the a civil aviation agency (CAA) (e.g., the Federal Aviation Administration (FAA) in the United States (US), etc.). In an example, the public key of the CA may be received in the response or another communication, or can otherwise be known by the UAV. In this example, based on authenticating the response, registering component 352 can store one or more parameters of the response for securing subsequent communications, as described further herein. Moreover, for example, the UUID may include a temporary identifier portion that can be unique to the UFCF, USS, or otherwise to the geographic region within which the UAV 202 operates. The UUID may also include information that enable the discovery via Domain Name Server (DNS) of the UFCF, USS, etc. that issued the UUID, for retrieving information regarding the UAV based on the UAV being identified via the UUID.

In another example, the response may further include a key pair (e.g., a public key and private key pair) to be used with the UAV certificate. In an example, the key pair generated by the UFCF (or USS), as described further herein, or may be generated by the registering component 352 and provided to the mobile network in the request at Block 502. The public key of the key pair may be signed by the network using the private key associated with the network certificate. In any case, the UE 104/UAV 202 can use the parameters from the response to secure subsequent communications.

In method 500, optionally at Block 510, broadcast information for transmitting to one or more UAVs or network components can be generated. In an aspect, communicating component 342, e.g., in conjunction with processor(s) 312, memory 316, transceiver 302, etc., can generate the broadcast information for transmitting to the one or more UAVs or network components. For example, the broadcast information can include information for identifying the UAV, flight information, and/or the like, as described above or further herein. For example, the broadcast information can include an identifier of the UAV (e.g., UUID), and/or other information that can enable a receiver to identify the UAV or retrieve the complete set of identification information for the UAV (e.g., identifying information of the UAV owner and remote pilot), etc. For example, the flight information can include a set of information that the UAV broadcasts regarding flight (e.g., location, altitude, speed, direction, etc.).

In method 500, optionally at Block 512, at least the UAV identifier of the broadcast information can be signed with a private key associated with the UAV certificate. In an aspect, communicating component 342, e.g., in conjunction with processor(s) 312, memory 316, transceiver 302, etc., can sign at least the UAV identifier of the broadcast information with the private key associated with the UAV certificate (e.g., as received in the response to the request to register). Signing the UAV identifier in this regard can facilitate securing and/or authenticating the broadcast information as being associated with, being communicated by, etc. the associated UAV.

In method 500, optionally at Block 514, at least the flight information can be signed with a public key associated with the certificate of the UAV. In an aspect, communicating component 342, e.g., in conjunction with processor(s) 312, memory 316, transceiver 302, etc., can sign at least the flight information, which can be included in the generated broadcast information, with the public key associated with the certificate of the UAV. For example, the public key associated with the certificate of the UAV can also be received in the response to the request at Block 502. Thus, in one example, the broadcast information can include the UAV identifier signed with the private key and the flight information signed with the public key.

In method 500, optionally at Block 516, the UAV identifier can be security protected (e.g. encrypted) using a public key associated with the network certificate. In an aspect, communicating component 342, e.g., in conjunction with processor(s) 312, memory 316, transceiver 302, etc., can security protect the UAV identifier with the public key associated with the network certificate. For example, communicating component 342 can perform confidentiality protection, such as encryption, for the UAV identifier. In an example, the UAV identifier can be both signed using the private key (e.g., associated with the UAV certificate, as described in Block 512), and security protected using the public key (e.g., associated with the network certificate). As described, the public key associated with the network certificate can also be received in the response to the request at Block 502. Using this key to protect the UAV identifier can allow the network component that issued the key to be able to authenticate the broadcast information from the UAV 202.

In method 500, optionally at Block 518, the broadcast information can be transmitted to the one or more UAVs or network components. In an aspect, communicating component 342, e.g., in conjunction with processor(s) 312, memory 316, transceiver 302, etc., can transmit the broadcast information to one or more UAVs (e.g., over a U2U interface) or network components (e.g., UFCF, USS, or other aerial network components, a GCS, etc.). The receiving node can authenticate the communication based on the signed UAV identifier and/or the signed flight information using the transmitted UAV certificate.

Figure 6:
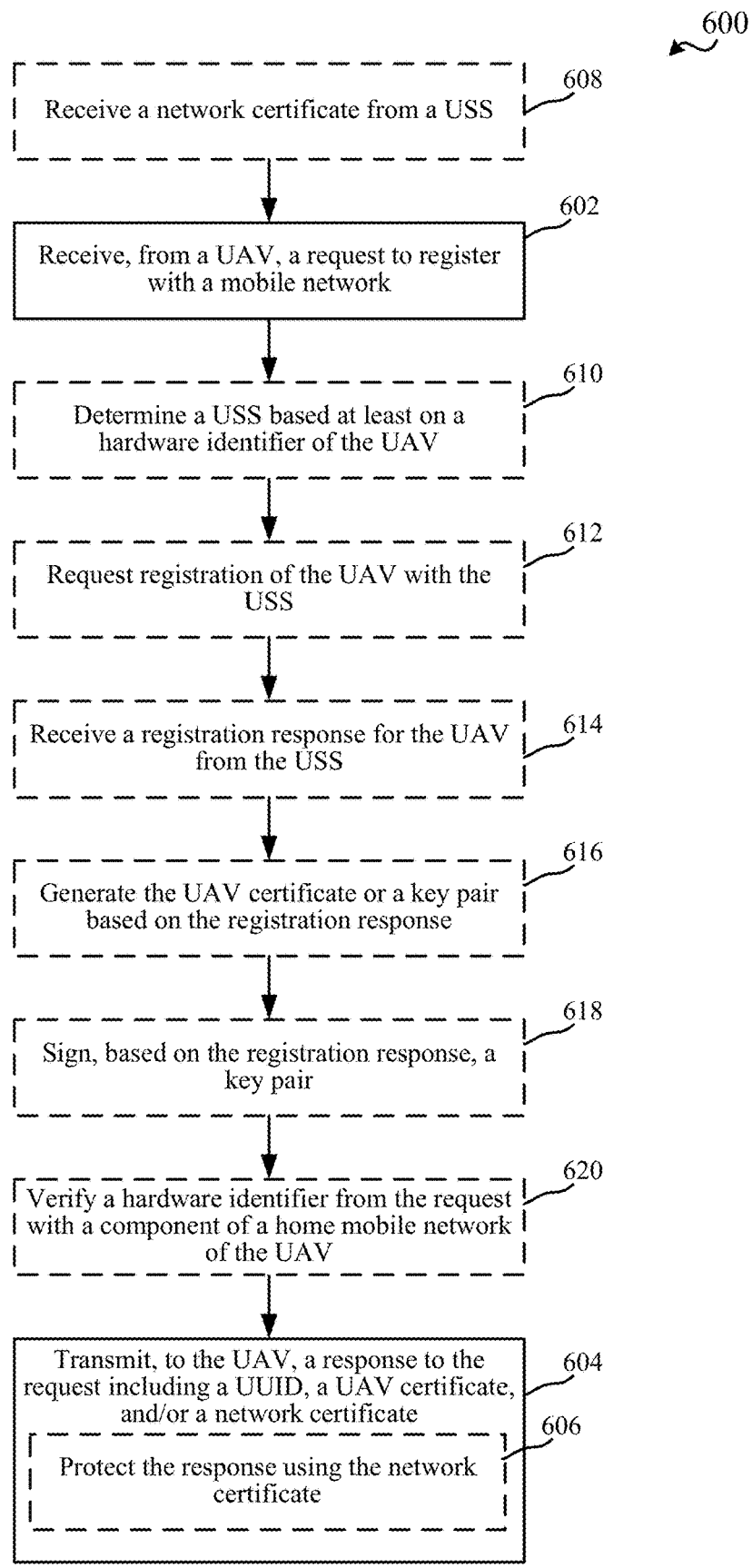
FIG. 6 is a flow chart illustrating an example of a method for provisioning mobile network credentials to UAVs, in accordance with various aspects of the present disclosure.

FIG. 6 illustrates a flow chart of an example of a method 600 for provisioning security information to a UAV for communicating using a mobile network. In an example, a UFCF 204 can perform the functions described in method 600 using one or more of the components described in FIGS. 2 and 4.

In method 600, at Block 602, a request to register with a mobile network can be received from a UAV. In an aspect, registration requesting component 452, e.g., in conjunction with processor(s) 412, memory 416, network interface 440, configuring component 442, etc., can receive, from the UAV, the request to register with the mobile network. As described above, in one example, the request can be received over a limited access connection with the UAV. In addition, for example, the request may include at least a hardware identifier of the UAV, which may be signed with a manufacturer certificate, or with a private key associated with the manufacturer certificate as described. Moreover, for example, the request may identify an operator, pilot, etc. of the UAV for further consideration in registering the UAV with the mobile network.

In method 600, at Block 604, a response to the request including a UUID, a UAV certificate, and/or a network certificate can be transmitted to the UAV. In an aspect, security information component 454, e.g., in conjunction with processor(s) 412, memory 416, network interface 440, configuring component 442, etc., can transmit, to the UAV, the response to the request including the UUID, the UAV certificate, and/or the network certificate. In an example, UFCF 204 can generate one or more of the parameters for the response and/or a USS can generate one or more parameters for the response, as described further herein. For example, security information component 454 can verify one or more identifiers received in the request in transmitting (or generating) the response. For example, security information component 454 can authenticate the hardware identifier (e.g., the UAV identifier) based on a hardware UAV certificate issued by the manufacturer of the UAV or the certificate of a manufacturer of the UAV, can verify an operator or pilot identifier as authorized to operate the UAV, etc. as part of transmitting (or generating) the response. The network certificate can be issued by a CA and is assigned to either the UFCF or the USS.

In transmitting the response, optionally at Block 606, the response can be protected based on the network certificate. In an aspect, security information component 454, e.g., in conjunction with processor(s) 412, memory 416, network interface 440, configuring component 442, etc., can protect the response based on the network certificate. For example, security information component 454 can sign the response using a private key associated with the network certificate (e.g., which may be a certificate associated with the UFCF or the USS), or a private key of the Certificate Authority associated with the CAA, before transmitting the response to the UAV. Signing the response with the private key associated with the network certificate can allow the UAV to authenticate the response by verifying the response using a public key associated with the network certificate (e.g., which may be a certificate associated with the UFCF or the USS), or the public key of the Certificate Authority associated with the CAA.

In method 600, optionally at Block 608, a network certificate for a USS can be received. In an aspect, configuring component 442, e.g., in conjunction with processor(s) 412, memory 416, network interface 440, etc., can receive the network certificate from the USS in a communication from the USS or other configuration received from one or more components of an aerial network. The UFCF 204 can provide the certificate of the USS to UAVs to allow the UAVs to authenticate communications from the UFCF 204 (such as responses to requests for registering on the mobile network). In one example, security information component 454 can sign the response using the key associated with the network certificate received from the USS.

In method 600, optionally at Block 610, a USS can be determined based at least on a hardware identifier of the UAV. In an aspect, registration requesting component 452, e.g., in conjunction with processor(s) 412, memory 416, network interface 440, configuring component 442, etc., can determine the USS based at least on the hardware identifier of the UAV. For example, the hardware identifier of the UAV may allow for determining a USS associated with the manufacturer or region of the UAV. In one example, configuring component 442 may request the network certificate from the USS based on determining the USS (e.g., which can be received at Block 608). In another example, configuring component 442 can determine which of multiple network certificates to use to protect the response based on the determined USS (e.g., based on determining which of the multiple network certificates are associated with the USS).

In another example, in method 600, optionally at Block 612, registration of the UAV can be requested with the USS. In an aspect, registration requesting component 452, e.g., in conjunction with processor(s) 412, memory 416, network interface 440, configuring component 442, etc., can request registration of the UAV with the USS. For example, registration requesting component 452 can request the registration based on determining the USS associated with the UAV. For example, registration requesting component 452 can transmit a request to the USS that can include the hardware identifier of the UAV. In this example, the USS can verify the hardware identifier of the UAV (e.g., by authenticating the hardware identifier based on a certificate of the manufacturer). In addition, the request to register the UAV may include other parameters of the request received at Block 602, such as an identifier of an operator, pilot, etc. of the UAV, and the USS can further certify the operator, pilot, etc. is authorized to operate the UAV, etc.

In method 600, optionally at Block 614, registration response for the UAV can be received from the USS. In an aspect, registration requesting component 452, e.g., in conjunction with processor(s) 412, memory 416, network interface 440, configuring component 442, etc., can receive the registration response for the UAV from the USS. For example, registration requesting component 452 can receive the registration response, which may include one or more parameters for providing to the UAV (e.g., the UUID, UAV certificate, and/or network certificate). In another example, the registration response may include a key pair for the UAV to use with the UAV certificate in signing communications to be transmitted to other UAVs or network components.

In method 600, optionally at Block 616, the UAV certificate or a key pair can be generated based on the registration response. In an aspect, security information component 454, e.g., in conjunction with processor(s) 412, memory 416, network interface 440, configuring component 442, etc., can generate the UAV certificate or the key pair based on the registration response (e.g., based on receiving the registration response). For example, security information component 454 may generate the UAV certificate based on an event of receiving the registration response and/or based on information received in the registration response. In addition, in an example, security information component 454 can generate the UUID, and may have provided the UUID in the registration request sent to the USS at Block 612. In any case, the generated or received UUID, UAV certification, key pair, etc. can be indicated in the response to the UAV to allow the UAV to use this information in securing subsequent communications.

In another example, in method 600, optionally at Block 618, a key pair can be signed based on the registration response. In an aspect, security information component 454, e.g., in conjunction with processor(s) 412, memory 416, network interface 440, configuring component 442, etc., can sign, based on the registration response, the key pair. For example, security information component 454 can receive the key pair from the UAV as part of the request received at Block 602, and can sign the key pair based on successful registration of the UAV with the USS.

In another example, in method 600, optionally at Block 620, a hardware identifier from the request can be verified with a component of a home mobile network of the UAV. In an aspect, security information component 454, e.g., in conjunction with processor(s) 412, memory 416, network interface 440, configuring component 442, etc., can verify the hardware identifier from the request with a component of a home mobile network of the UAV. For example, the UAV may be associated with another region (and another USS or other aerial network components). In this example, security information component 454, e.g., as part of verifying the UAV for transmitting the response, as described above, can verify the UAV with its home aerial network. In an example, security information component 454 can send a registration request to a USS or UFCF in the home network of the UAV, and can receive, based on the registration request, a registration response as to whether the UAV can be registered/authenticated based on the provided hardware identifier (e.g., based on the USS or UFCF of the home network authenticating the hardware identifier using the hardware UAV certificate issued by the manufacturer of the UAV or the certificate of a manufacturer of the UAV, etc.).

Figure 7A:
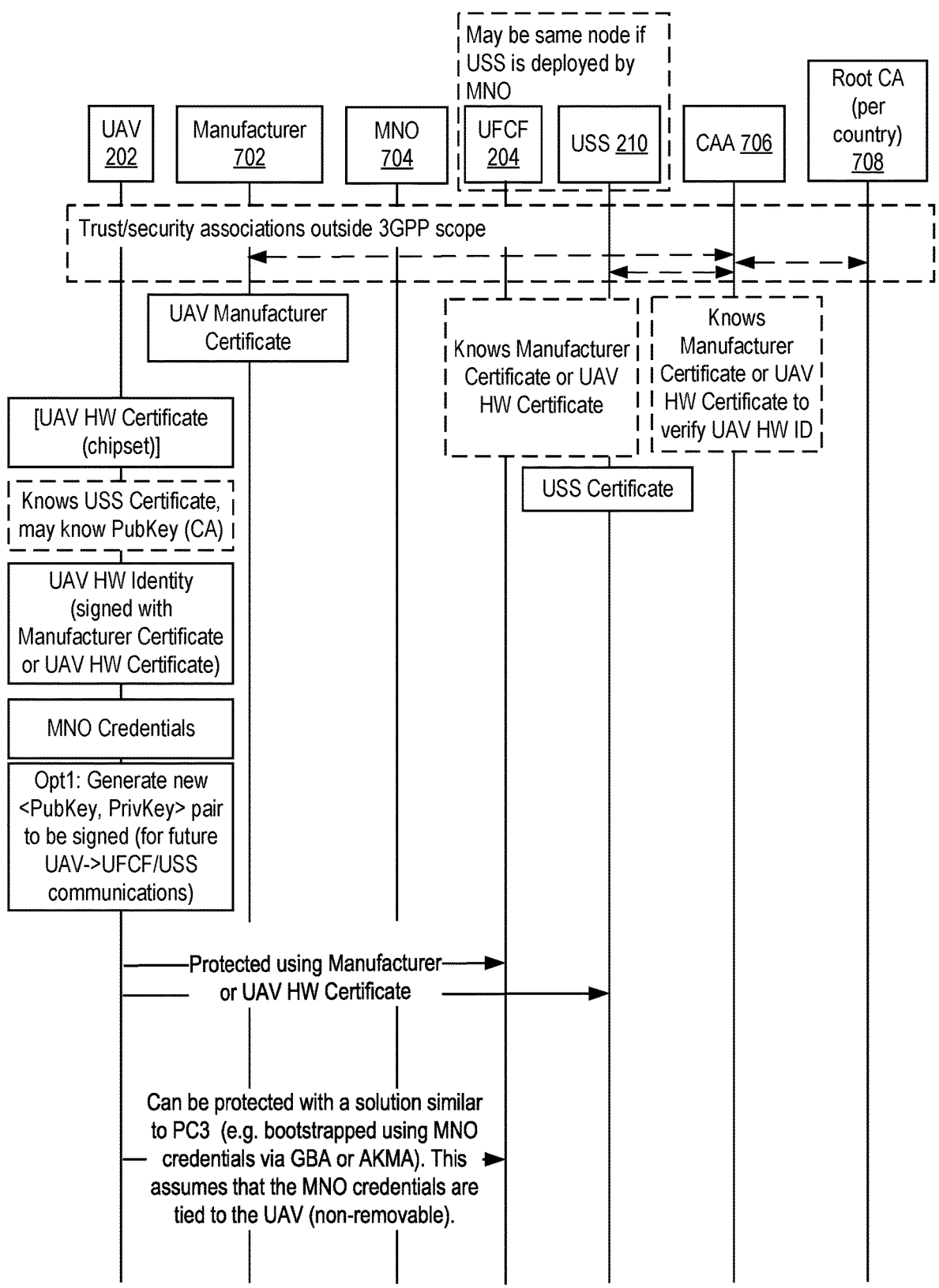
FIGS. 7A-7B illustrate a system of various network components and associated identities and security credentials, in accordance with various aspects of the present disclosure.
Figure 7B:
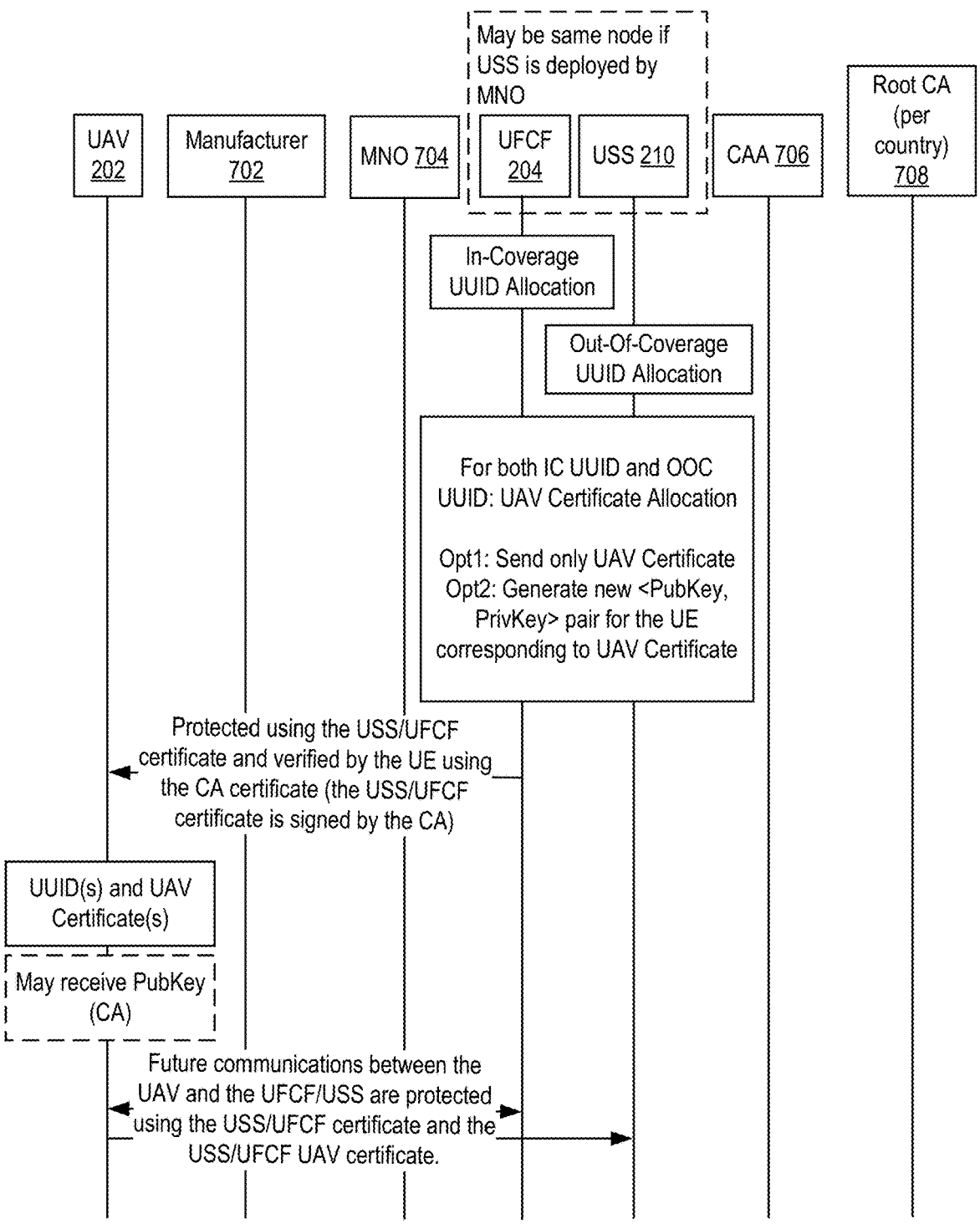

FIGS. 7A-7B illustrate an example of various network components and associated identities and security credentials, as described in examples above and further herein. In an example, FIGS. 7A-7B illustrate creation and provisioning of UAV identities to the UAV 202 (which may not be the same as USS Specific Authentication and Authorization (USAA)). FIGS. 7A-7B can illustrate sequential steps among nodes to perform the described functions, where the steps in FIG. 7A can be performed followed by the steps in FIG. 7B. The UAV 202 can be associated with a manufacturer 702 thereof, which can provide a manufacturer certificate to allow the UAV 202 to sign communications for securing or authenticating the communications, as described herein. In this example, the "aviation level" UAV identity can be visible to the MNO 704 core network (CN), which can include a 3GPP mobile network for example (e.g., 3GPP mobile network 212 in FIG. 2). In an example, the mobile network (e.g., 3GPP system) can provide mobile network identities to the UAV components for operations over the MNO 704, where the identities can be used for both broadcast remote identifier (BRID) and network remote identifier (NRID) and communications between the MNO 704 and the USS 210, which can be provided by or associated with a UFCF 204. For example, the UUID can allow the identification of the network function where UAV registration information is kept. In some examples, FAA (or other CAA in other regions) can be used as aviation regulator function. More generically, CAA 706 can be referred to herein for a generic aviation regulator function, which may be location-specific, government-specific, etc. such to regulate aviation traffic in one or more geographic areas. Some areas or bodies (e.g., CAAs) may have a privacy requirement to change the certificates assigned to a UAV to protect the information broadcast by the UAV. CAA 706 can be associated with a root CA 708 (e.g., per country).

In an example, a solution similar to the one adopted in V2X may be considered. The UAV Identifiers and Credentials Bootstrapping (UICB) may occur according to the following model: UICB can take place over Uu connectivity via the MNO to which the UAV has a subscription (e.g., Out-of-band UICB is also possible); an In Coverage UICB can take place over Uu (which can be performed by the UFCF); and an Out Of Coverage UICB can also take place for the UAV for out of coverage operations (which can be performed by the USS). In an example, a UAV may have both In Coverage UICB and Out Of Coverage UICB identities and credentials, to be used mutually exclusively for the two scenarios. Additionally, for example, a network UAVc, and a non-networked UAVc in the internet can perform a similar UUID and credentials bootstrapping.

Figure 8A:
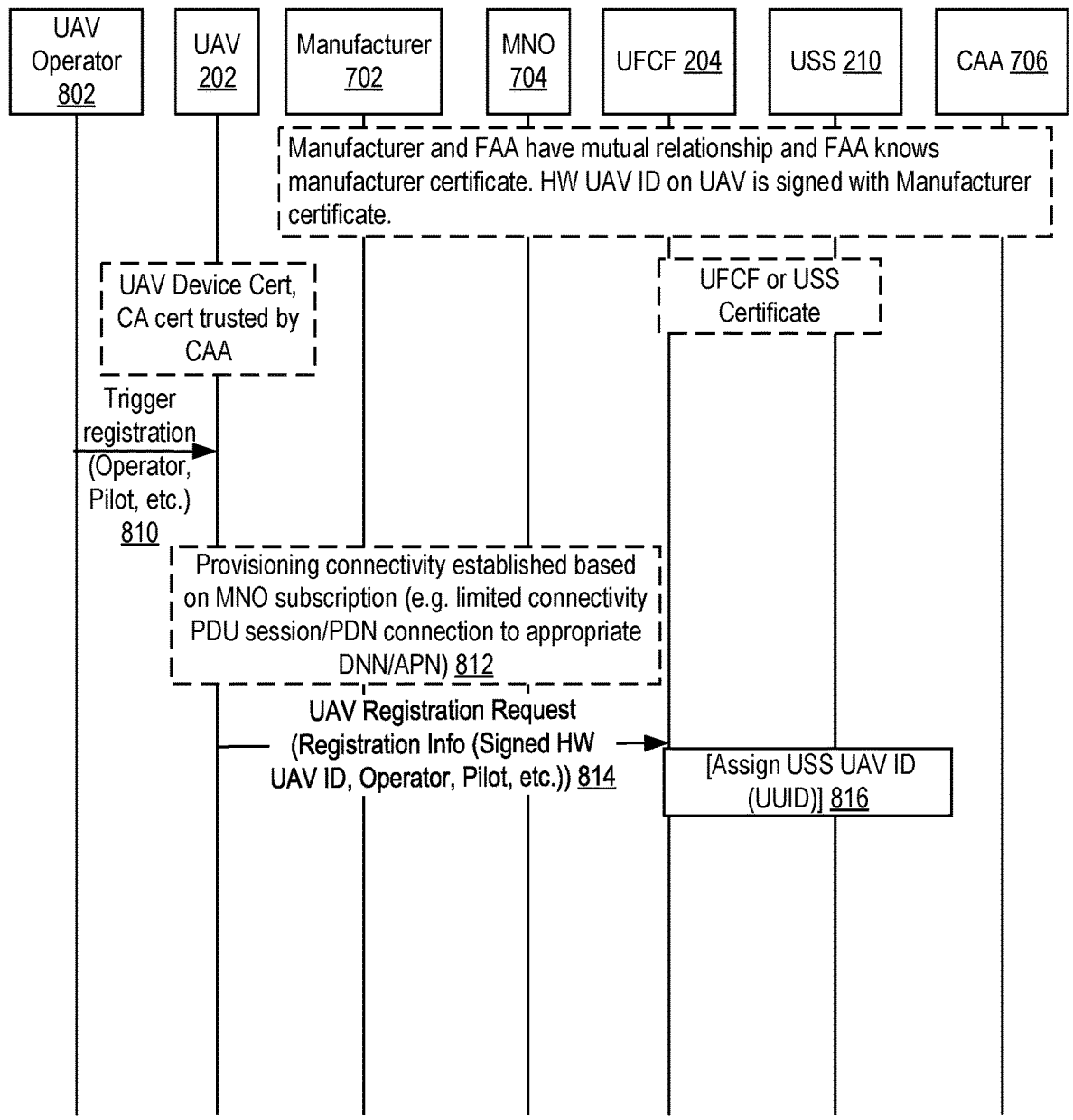
FIGS. 8A-8B illustrate a system for UAV identity registration and allocation based on UAV bootstrapping, in accordance with various aspects of the present disclosure.
Figure 8B:
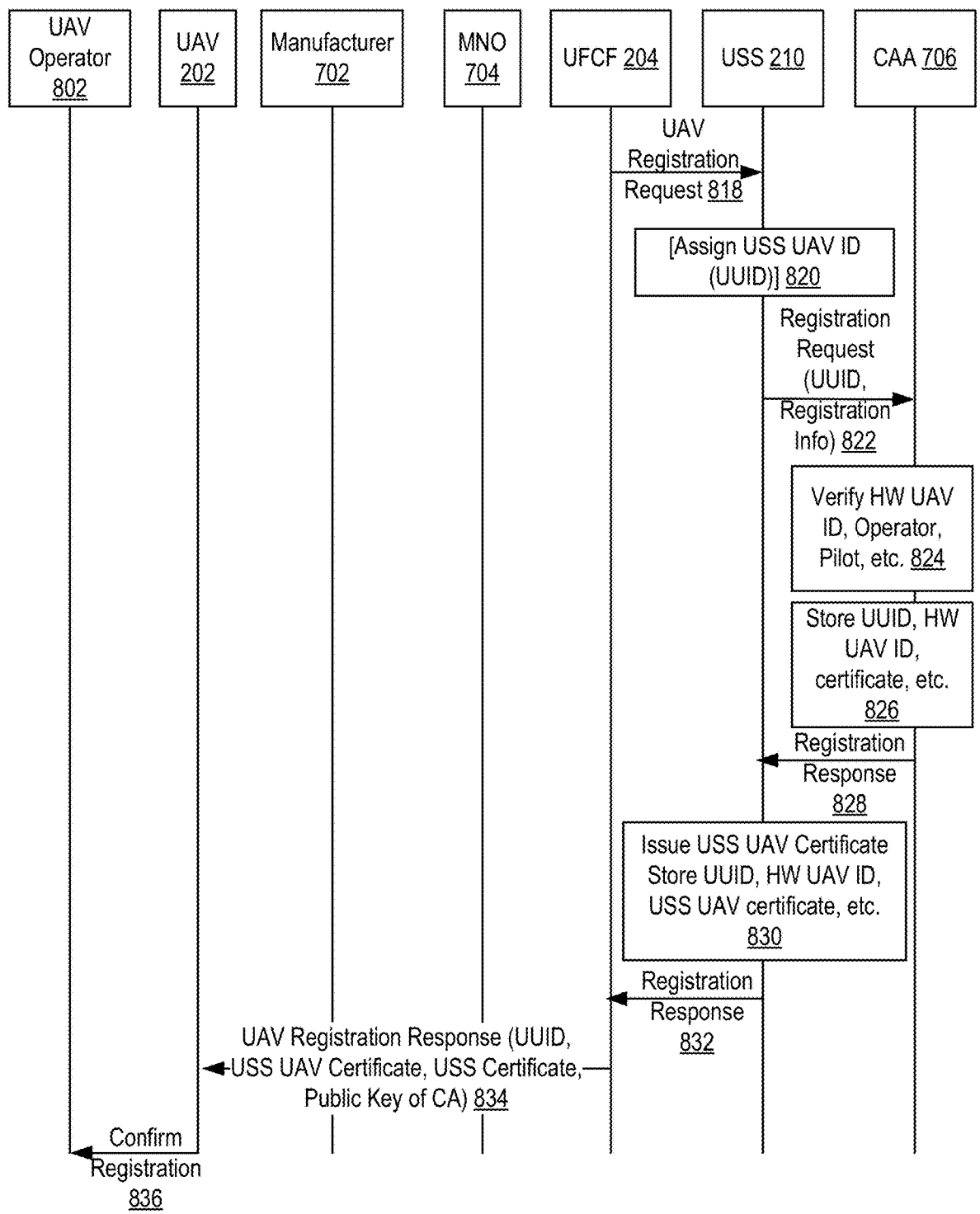

FIGS. 8A-8B illustrates an example of various network components for UAV identity registration and allocation based on UAV bootstrapping. In this example, in FIG. 8A, the manufacturer 702 can register its certificate to CAA 706 and issue the hardware (HW) UAV ID and the associated UAV Device certificate for a UAV. The UAV Device certificate can be verified using the manufacturer certificate. At 810, the UAV operator 802 that wishes to put the UAV 202 in operation can provision an MNO subscription and trigger the UAV registration with CAA 706. At 812, it can be assumed that the UAV 202 registers to the MNO network 704 with limited connectivity for UAV provisioning, enabling only connectivity to UFCF 204. This may be via a special APN/DNN, or via a dedicated bearer in a generic PDN connection/PDU session with QoS and default traffic filters that only allow connectivity to the UFCF 204.

At 814, the UAV 202 can send a registration request to the UFCF 204, providing Registration Information including the HW UAV ID signed with the Manufacture certificate and the information obtained from the UAV operator (e.g. UAV pilot identification, UAV operator identification, etc.). In one example, for generation of a UAV certificate, the UAV 202 can also generate a new pair of public/private keys and send a certificate signing request (containing the generated public key) to the core network signed with the UAV Device certificate. This message is protected between the UAV 202 and the UFCF 204 or the USS 210 using the hardware UAV certificate issued by the manufacturer 702 of the UAV 202 or the certificate of a manufacturer 702 of the UAV 202 (e.g. protected using the private key of the hardware UAV certificate issued by the manufacturer 702 of the UAV 202 or the certificate of a manufacturer 702 of the UAV 202). The UFCF 204 or the USS 210 may verify the protected information (e.g. using the public key of the hardware UAV certificate issued by the manufacturer 702 of the UAV 202 or the certificate of a manufacturer 702 of the UAV 202) and may send at least a portion of the protected information to the CAA 706 for verification.

The HW UAV ID and the UAV certificate may be based on the chipset hardware security solutions, which may detach from UAV manufacturer reliance and relying on chipset manufacturer security. If the message needs to be protected between the UAV 202 and the UFCF 204 (e.g., the case where UUID is allocated by UFCF 204 and the UAV certificate is provided by the UFCF 204), this can be protected with a solution similar to PC3 (e.g. bootstrapped using MNO credentials via generic bootstrapping architecture (GBA) or authentication and key agreement (AKMA) when the UAV establishes connectivity). This can be based on an assumption that the MNO credentials are tied to the UAV 202 (e.g., and are non-removable). This may not occur if UAV 202 is able to change MNO subscriptions. The UAV may be preconfigured with information for UFCF 204 discovery in the current public land mobile network (PLMN), or may perform discovery via domain name system (DNS). In this example, at 816, the UFCF may assign a UUID for the UAV 202.

Continuing to FIG. 8B, at 818 (e.g., after step 816 in FIG. 8A), the UAV 202 may provide information (e.g. a combination of UAV HW ID, operator ID, etc.) to help in the USS 210 selection (e.g. the USS serving a specific operator). UFCF 204 can select the USS 210 based on such information. Alternatively, the USS address may be preconfigured in the UAV MNO subscription, for USS 210 operated by the MNO 704, and provided by the UAV 202 to the UFCF 204. If UUID is assigned by UFCF 204, the UFCF 204 can provide the UUID. It may be assumed that the UAV 202 is provisioned with the USS certificate with which the UAV 202 verifies the registration response (or the information carried in the response) received from USS 210. At 820, the USS 210 may assign an USS UAV ID (UUID) if not assigned by the UFCF 204. At 822, the USS 210 can trigger registration with CAA 706 (security and trust between USS 210 and CAA 706 may exist), providing the assigned UUID and the Registration Information. At 824 and 826, CAA 706 can verify the HW UAV ID using the manufacturer certificate, and store the correlation between the HW UAV ID, the UUID, operator, pilot, etc. for future verification. At 828, the CAA 706 can confirm the registration to the USS 210, optionally providing any required CAA configuration information for the UAV 202.

In this example, at 830, if the USS 210 assigned the UUID, the USS 210 can issue an USS UAV Certificate (referred to herein as "UAV certificate," which is sent to the UAV 202 signed with the USS certificate). If the UAV 202 sent a certificate singing request, the USS 210 can send only the USS UAV certificate. If the UAV 202 did not send a certificate signing request, the USS 210 can generate a pair of public/private keys to be used with the USS UAV Certificate for future communications between the UAV 202. The USS 210 can store the correlation between all such information. At 832, the USS 210 can create the USS Configuration Policy from CAA configuration information and local USS policies. The USS 210 can confirm the registration to the UFCF 204 and provide the UUID, if assigned, and the UFCF 204 can store the UAV information.

At 834, the UFCF 204 can confirm the registration to the UAV 202 providing the UUID, the USS UAV Certificate (if UUID is provided by the USS) issued to the UAV, the USS Certificate (if UUID is provided by USS), the Public Key associated with the certificate authority, and UAV Configuration Information including CAA and USS configuration information. If the UFCF 204 provides the UUID, the UFCF 204 can issue an UFCF UAV Certificate (referred to herein as the "UAV certificate"). If the UAV 202 sent a certificate signing request, the UFCF 204 can send only the UFCF UAV certificate. If the UAV 202 did not send a certificate signing request, the UFCF 204 can generate a pair of public/private keys to be used with the UFCF UAV Certificate for future communications between the UAV 202 and the UFCF 204. The UFCF 204 can also provide the USS Configuration Policy and the UFCF Configuration Policy. The communication can be protected using the USS/UFCF certificate and verified by the UE using the CA certificate since the USS/UFCF certificate is signed by the CA. At 836, the UAV 202 can confirm registration to the UAV operator 802. Future communications between the UAV 202 and the UFCF 204/USS 210 can be protected using the USS/UFCF certificate and the USS/UFCF UAV certificate.

Figure 9:
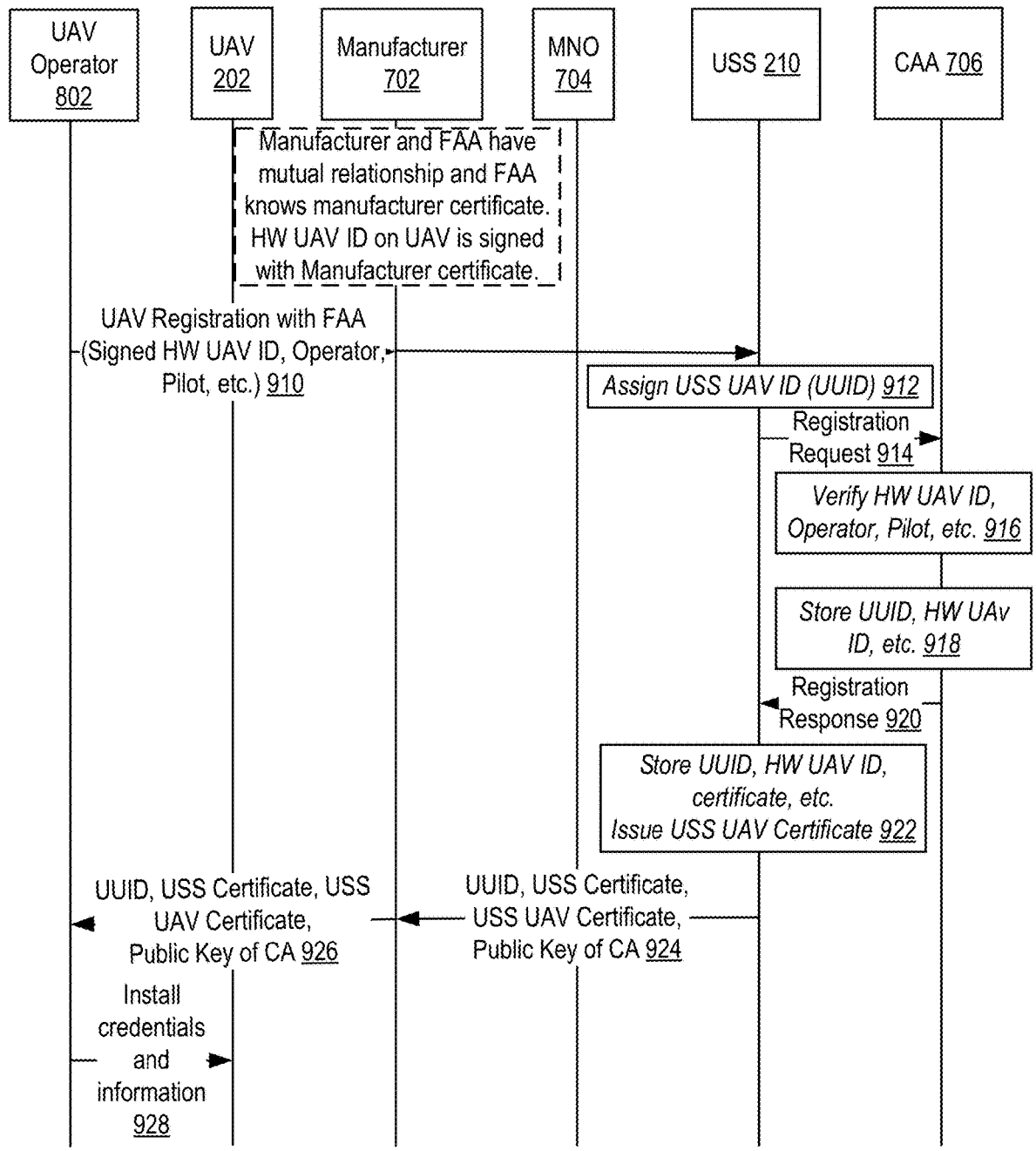
FIG. 9 illustrates a system for UAV identity registration and allocation based on HW UAV information, in accordance with various aspects of the present disclosure.

FIG. 9 illustrates an example of various network components for UAV identity registration and allocation based on HW UAV information. In this example, the manufacturer 702 can share a secure relationship with CAA 706, and is certified by the CAA 706. The procedure can be performed out of band and with no MNO intervention, without using MNO connectivity, etc. In this example, at 910, the operator 802 that wishes to put the UAV 202 in operation can trigger the UAV registration with CAA 706 via the manufacturer 702 and can send a registration request to the USS 210, providing Registration Information including the signed HW UAV ID (signed with the Manufacturer UAV certificate), the operator information, and the pilot information. The request can be protected using the public key associated with the Manufacturer Certificate. At 912, the USS 210 can assign temporarily an USS UAV ID (UUID). At 914, 916, 918, 920, the USS 210 can trigger registration with CAA 706 (security and trust between USS and CAA may be provided), providing the assigned UUID and the Registration Information. CAA 706 can verify the HW UAV ID, and store the correlation between the HW UAV ID, the UUID, operator, pilot, etc. fur future verification. The CAA 706 can confirm the registration to the USS 210, optionally providing any required CAA configuration information for the UAV 202 in registration response 920. At 922, the USS 210 can create the USS Configuration Policy from CAA configuration information and local USS policies. The USS 210 can issue an USS UAV Certificate for future communications and stores the correlation between all such information (sent to the requester signed with the USS certificate). At 924 and 926, the USS 210 can confirm the registration providing the UUID, the USS UAV Certificate assigned to the UAV 202, the USS Certificate, the Public Key associated with the CA-issued certificate, and UAV Configuration Information including CAA and USS configuration information. The communication can be protected using the USS certificate and verified by the UE using the CA-issued certificate (the USS certificate is signed by a key associated with the CA). At 928, the operator 802 can onboard the configuration information to the UAV 202.

Figure 10:
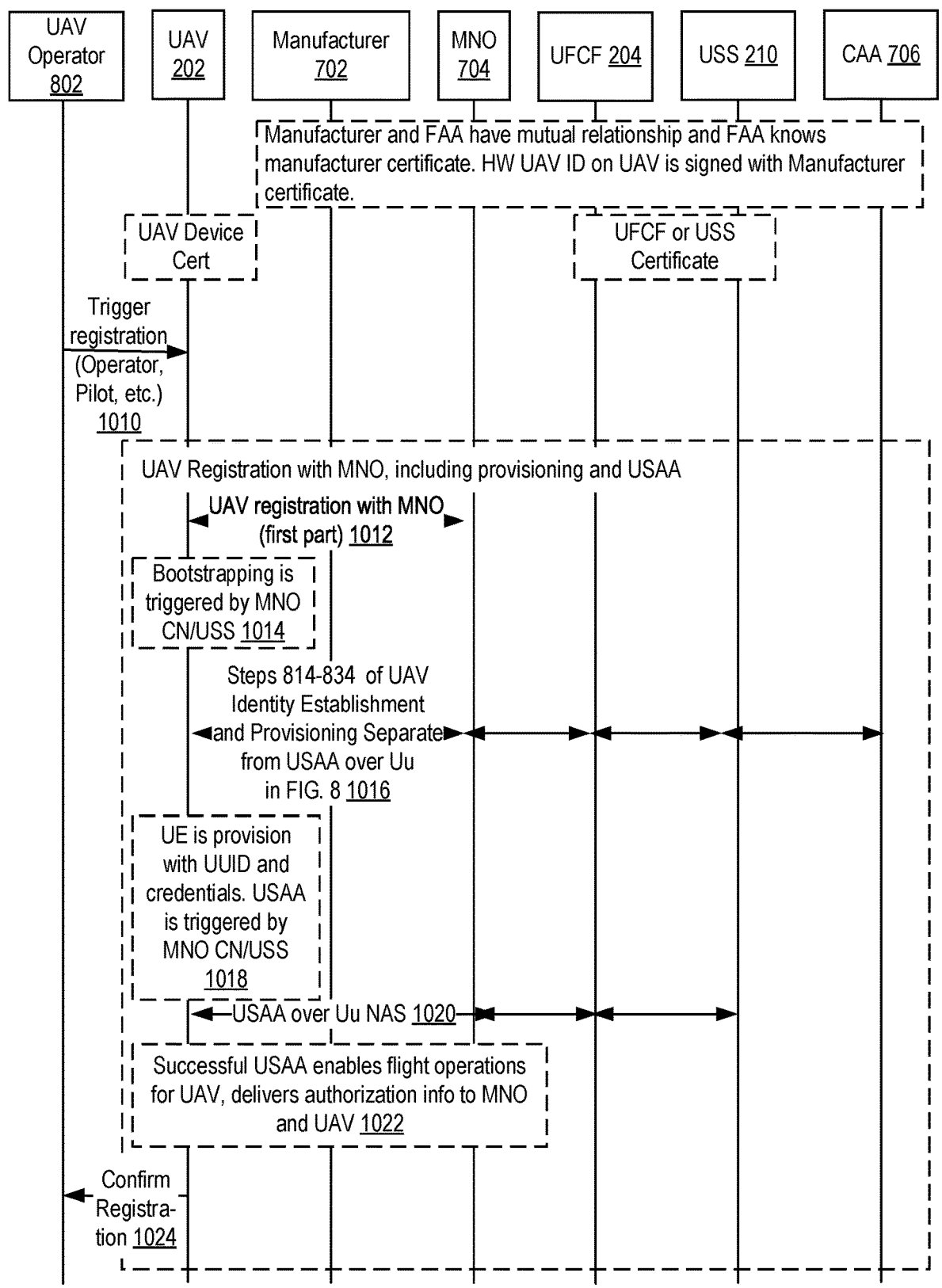
FIG. 10 illustrates a system for MNO-based security bootstrapping where UAV identity registration and allocation is based on UAV bootstrapping, in accordance with various aspects of the present disclosure.

FIG. 10 illustrates an example of various network components for MNO-based security bootstrapping where UAV identity registration and allocation is based on UAV bootstrapping. In this example, the UE is provisioned UAV Identities during USAA. The manufacturer 702 can share a secure relationship with CAA 706 and signs the HW UAV ID with the UAV Device certificate. At 1010, the operator 802 that wishes to put the UAV 202 in operation can provision an MNO subscription and triggers the UAV registration with CAA 706. At 1012, the UAV 202 can perform registration with the MNO 704. This can be a Registration Procedure (in 5GS) or an Attach Procedure with PDN connection establishment (in EPC). At 1014, 1016, 1018, UICB can be performed and identities and credentials can be bootstrapped, as described above. Step 1016 can include performing steps 814 to 834 as shown and described in FIG. 8 above. UAV 202 can be provisioned with UUID and credentials and USAA can be triggered by CN, USS or UE, depending on the model. At 1020, USAA can be performed between UE of UAV 202, MNO 704, UFCF 204, USS 210. UFCF 204 can store the results of the USAA and any configuration information received during the USAA. USAA is performed using UAV credentials provided by UFCF 204 or USS 210 during bootstrapping. At 1022, successful USAA can enable UAV operations. At 1024, the UAV 202 can confirm registration to the UAV operator 802.

Figure 11A:
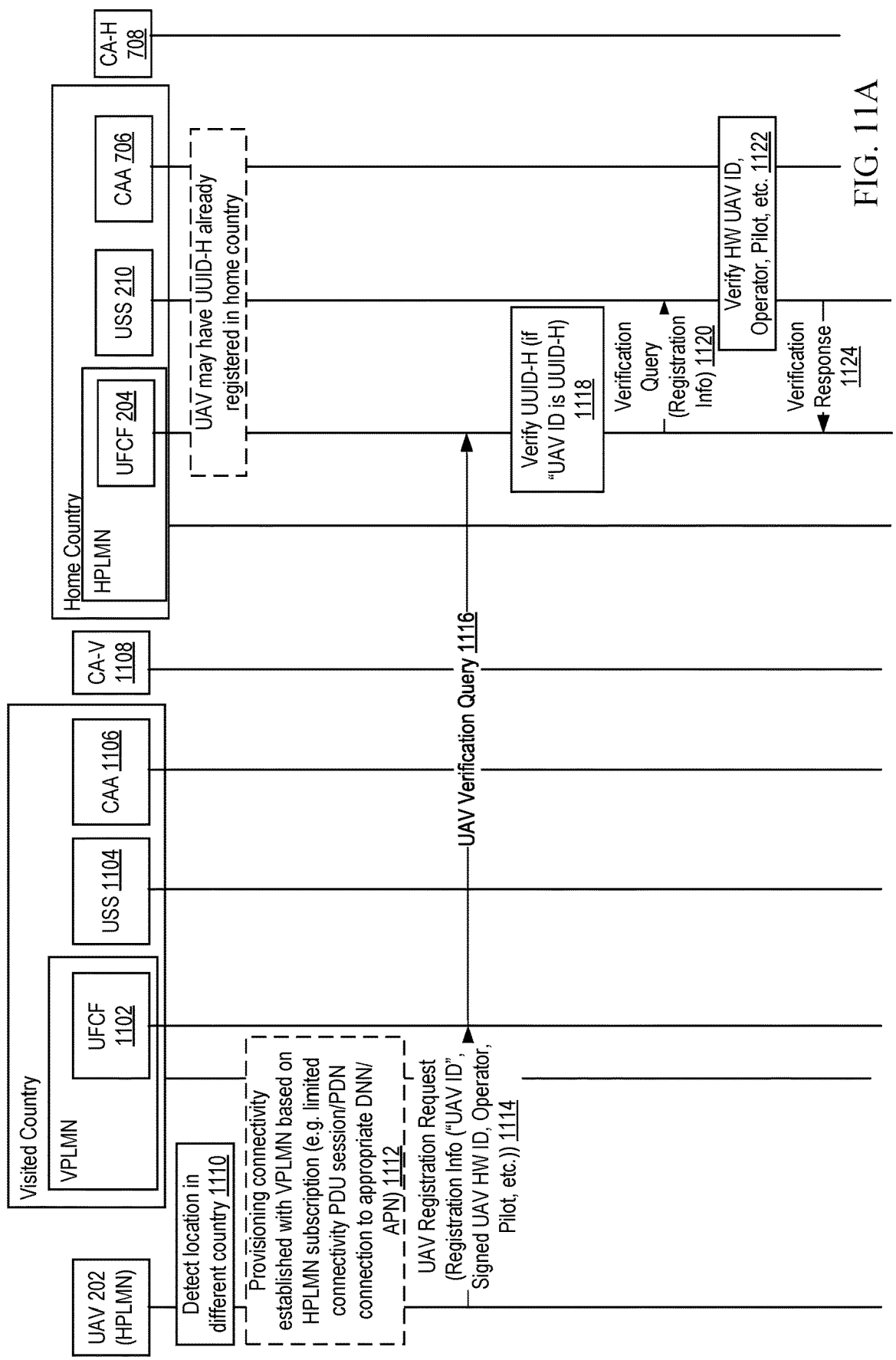
FIGS. 11A-11B illustrates a system for UAV identity registration and allocation based on detecting the UAV is located in a different country, in accordance with various aspects of the present disclosure.
Figure 11B:
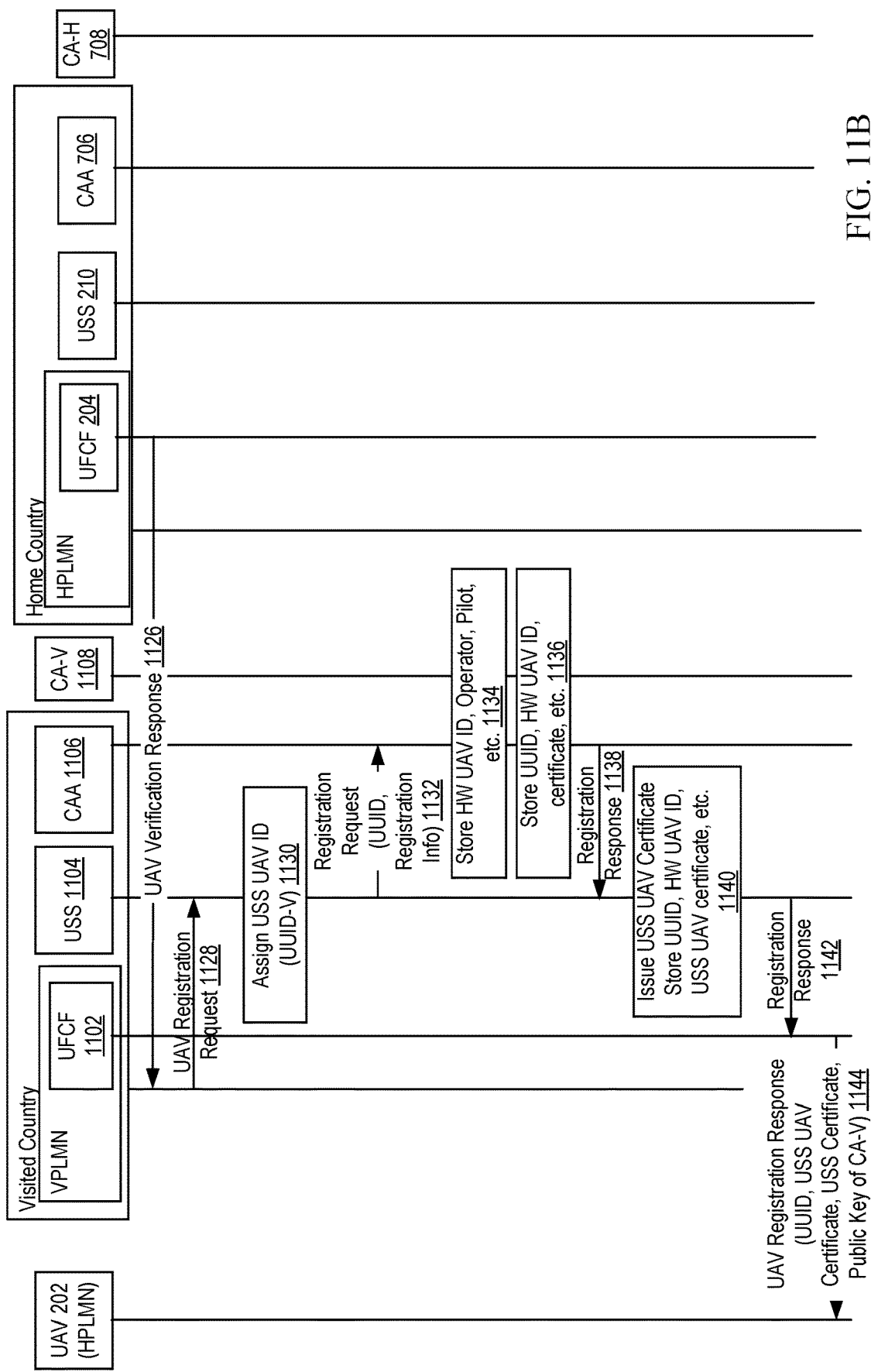

FIGS. 11A-11B illustrates an example of various network components for UAV identity registration and allocation based on detecting the UAV is located in a different country. In this example, in FIG. 11A, at 1110, the UE of the UAV 202 detects it is located in a different country (e.g. PLMN IDs of the available PLMNs). At 1112 it can be assumed that the UAV 202 registers to the MNO network with limited connectivity for UAV provisioning, enabling only connectivity to USS 1104, which can be provided by or associated with UFCF 1102 of the visited PLMN (VPLMN), as described. This may be via a special APN/DNN, or via a dedicated bearer in a generic PDN connection/PDU session with QoS and default traffic filters that only allow connectivity to the UFCF 1102. At 1114, the UAV 202 can send a registration request to the UFCF 1102 providing Registration Information including the signed HW UAV ID, UAV Device certificate and the information obtained from the UAV operator (e.g. UAV pilot identification, UAV operator identification, etc.). In addition, the UE of the UAV 202 can include the existing UUID-H if one is allocated, the UE subscription permanent identifier (SUPI), or a UAV generic public subscription identifier (GPSI) allocated to the UAV 202 by the home PLMN (HPLMN) to enable identification of the UFCF-H 204. In one example, the HW UAV ID and the UAV certificate may be based on the chipset hardware security solutions, as described. The UAV 202 may be preconfigured with information for UFCF-V 1102 discovery in the current PLMN, or perform discovery via DNS.

At 1116, the UFCF-V 1102 can use the UAV ID (may be UUID-H if any, the HPLMN UAV SUPI, or the UAV HPLMN GPSI) to discover the UFCF-H 204 (e.g. via DNS with an appropriately created fully qualified domain name (FQDN)) and forward a registration verification query containing the UAV information (Registration Information). The UFCF-H 204 can select the USS 210 in the home country (e.g. the USS serving a specific operator). Alternatively, the home USS address may be preconfigured in the UAV MNO subscription, for USS 210 operated by the MNO, and provided by the UAV 202 to the UFCF-V 1102 for forwarding to UFCF-H 204. It can be assumed that the UAV 202 is provisioned with the USS certificate with which the UAV 202 verifies the registration response (or the information carried in the response) received from USS, in this case USS-H 210. At 1118, the UFCF-H 204 can verify the UUID-H if any. At 1120, the UFCF-H 204 can forward the request to the USS-H 210. At 1122, the USS-H 210 can verify the UAV Registration Information (in particular UAV HW ID and the operator and pilot information). CAA-H 706 can verify the Signed HW UAV ID (possibly interacting with the Civil Aviation Authority to obtain the appropriate certificates), and/or can confirm the validity of the provided information to authorize the registration in the VPLMN. CAA-H 706 can be associated with a root CA (e.g., per country), which can be a CA-H 708. At 1124, the USS 210 can confirm the UAV information to the UFCF-H 204, which can be based on CAA-H 706 confirming the UAV information to the USS-H 210.

Continuing to FIG. 11B, at 1126 (e.g., after step 1124 in FIG. 11A), the USS-H or UFCF 204 can confirm the UAV information to the UFCF-V 1102. Steps 1128-1144 can be similar to steps 818-836 in FIG. 8, but performed via UFCF 1102, USS 1104, and CAA 1106 of a visited network/region. CAA-V 1106 can be associated with a root CA (e.g., per country), which can be a CA-V 1108. UAV 202 may retain UUID-H, but uses only UUID-V in BRID and NRID operations.

Figure 12:
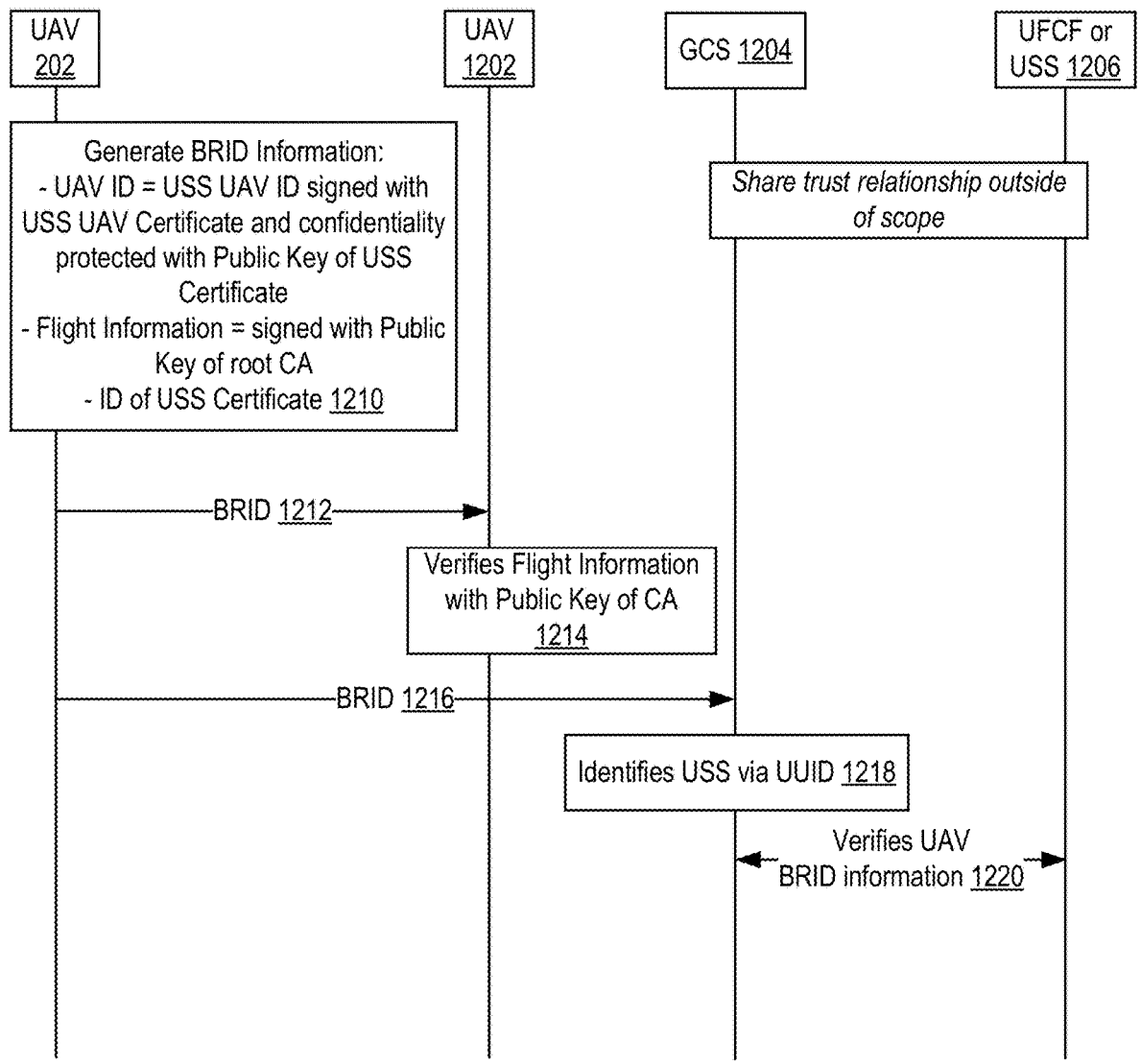
FIG. 12 illustrates a system for using UAV identity and credentials, in accordance with various aspects of the present disclosure.

FIG. 12 illustrates an example of various network components for using UAV identity and credentials. At 1210, the UAV 202 can determine if it is operating in coverage or out of coverage (i.e. is the UE connected to the MNO or not), and can select the UUID and corresponding credentials to be used to generate BRID broadcasting information. The UAV 202 generates the following for BRID broadcasting. This may include BRID UAV Identification, which can be the UAV UUID signed by the UAV with the USS/UFCF UAV Certificate and (partially) confidentiality protected using the public key associated with the USS certificate, and/or may include BRID UAV Flight Information, which can be signed with USS/UFCF UAV Certificate and verified with the public key associated with the CA-issued certificate (since USS/UFCF certificate is derived "under" the hierarchy of the CA). At 1212 and 1214, upon receiving the UAV BRID information, another UAV 1202 can receive and verify the validity of the Flight Information using the Public Key associated with the CA, which any UAV that is provided with an UUID during registration with an UFCF/USS and the CAA is provided during the registration procedure. At 1216 and 1218, upon receiving the BRID information from a UAV, the GCS 1204 can identify the relevant UFCF or USS 1206 using the UUID (if the UAV used in coverage UUID, it will be the MNO UFCF; otherwise it will be the USS). At 1220, the GCS 1204 can request information verification from the UFCF or USS 1206 by providing the UAV ID received in the BRID broadcast. The UFCF or USS 1206 can decipher and verify the content, retrieve the UAV information (ID, pilot, operator, etc.) and return it to the GCS 1204.

Figure 13:
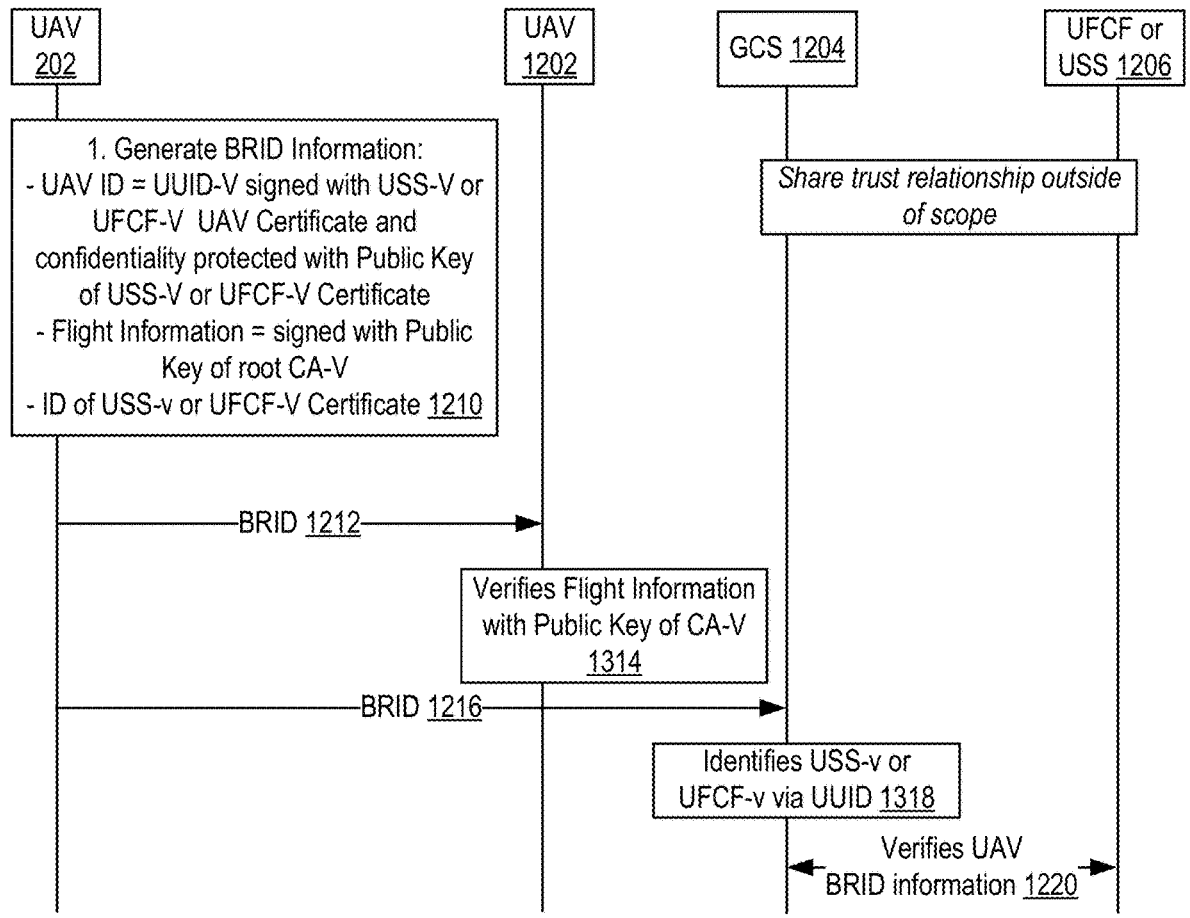
FIG. 13 illustrates a system for using UAV identity and credentials when roaming in a different country, in accordance with various aspects of the present disclosure.

FIG. 13 illustrates an example of various network components for using UAV identity and credentials when roaming in a different country. The components communicate similarly as in FIG. 12, but the UFCF or USS 1206 can be on the visited network. Thus, for example, verifying the flight information at 1314 can be with a public key of a CA-V (as opposed to a CA-H, as in FIG. 12), and the USS or UFCF identified at 1318 can be a USS-V or UFCF-V (as opposed or a USS-H or UFCF-H, as in FIG. 12).

Figure 14:
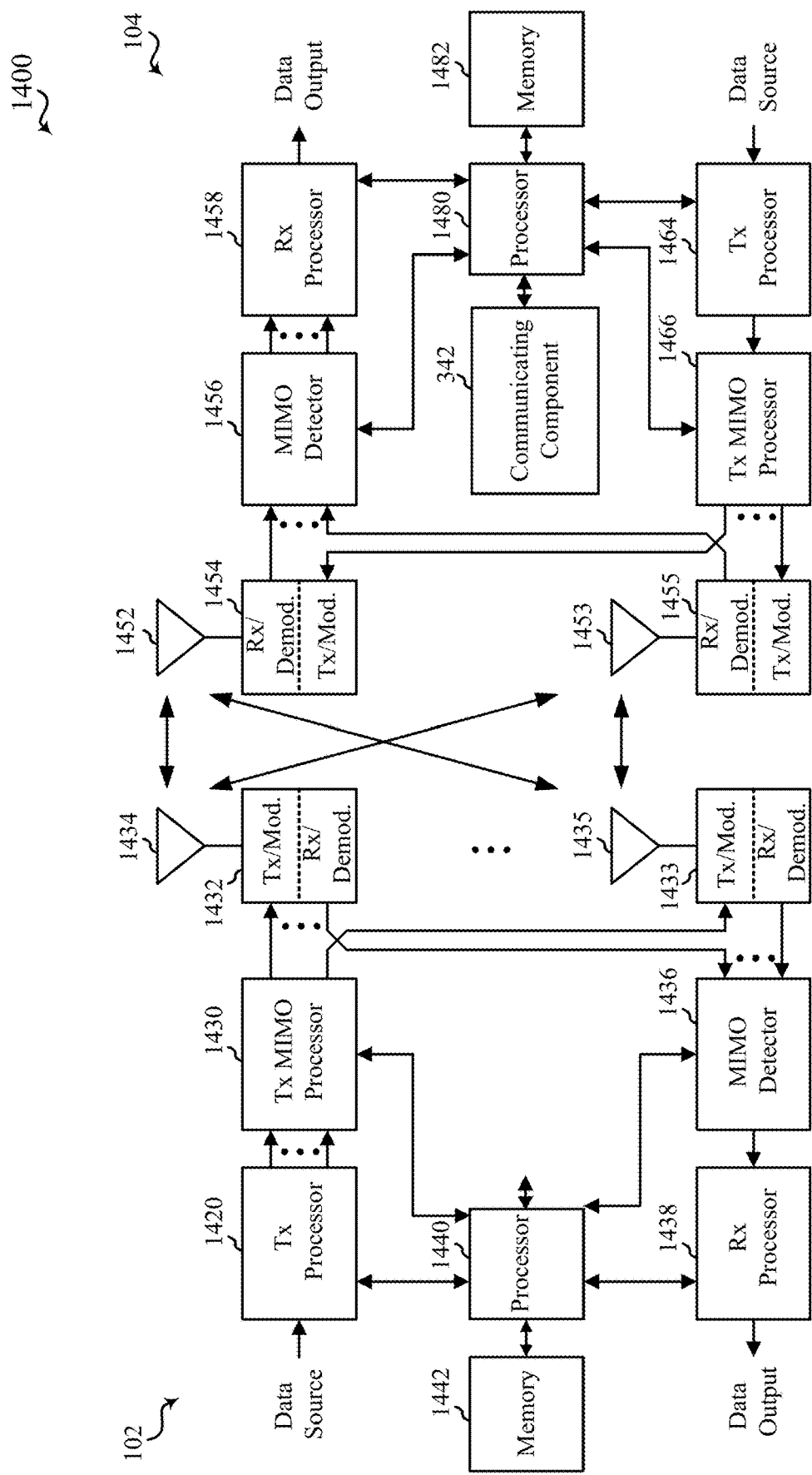
FIG. 14 is a block diagram illustrating an example of a MIMO communication system including a base station and a UE, in accordance with various aspects of the present disclosure.

FIG. 14 is a block diagram of a MIMO communication system 1400 including a base station 102 and a UE 104, in accordance with various aspects of the present disclosure. The MIMO communication system 1400 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 1434 and 1435, and the UE 104 may be equipped with antennas 1452 and 1453. In the MIMO communication system 1400, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1420 may receive data from a data source. The transmit processor 1420 may process the data. The transmit processor 1420 may also generate control symbols or reference symbols. A transmit MIMO processor 1430 may perform spatial processing (e.g., precoding) on data symbols, control symbols, or reference symbols, if applicable, and may provide output symbol streams to the transmit modulator/demodulators 1432 and 1433. Each modulator/demodulator 1432 through 1433 may process a respective output symbol stream (e.g., for OFDM, etc.) to obtain an output sample stream. Each modulator/demodulator 1432 through 1433 may further process (e.g., convert to analog, amplify, filter, and upconvert) the output sample stream to obtain a DL signal. In one example, DL signals from modulator/demodulators 1432 and 1433 may be transmitted via the antennas 1434 and 1435, respectively.

The UE 104 may be an example of aspects of the UEs 104 described with reference to FIGS. 1-2. At the UE 104, the UE antennas 1452 and 1453 may receive the DL signals from the base station 102 and may provide the received signals to the modulator/demodulators 1454 and 1455, respectively. Each modulator/demodulator 1454 through 1455 may condition (e.g., filter, amplify, downconvert, and digitize) a respective received signal to obtain input samples. Each modulator/demodulator 1454 through 1455 may further process the input samples (e.g., for OFDM, etc.) to obtain received symbols. A MIMO detector 1456 may obtain received symbols from the modulator/demodulators 1454 and 1455, perform MIMO detection on the received symbols, if applicable, and provide detected symbols. A receive (Rx) processor 1458 may process (e.g., demodulate, deinterleave, and decode) the detected symbols, providing decoded data for the UE 104 to a data output, and provide decoded control information to a processor 1480, or memory 1482.

The processor 1480 may in some cases execute stored instructions to instantiate a communicating component 342 (see e.g., FIGS. 2 and 3).

On the uplink (UL), at the UE 104, a transmit processor 1464 may receive and process data from a data source. The transmit processor 1464 may also generate reference symbols for a reference signal. The symbols from the transmit processor 1464 may be precoded by a transmit MIMO processor 1466 if applicable, further processed by the modulator/demodulators 1454 and 1455 (e.g., for SC-FDMA, etc.), and be transmitted to the base station 102 in accordance with the communication parameters received from the base station 102. At the base station 102, the UL signals from the UE 104 may be received by the antennas 1434 and 1435, processed by the modulator/demodulators 1432 and 1433, detected by a MIMO detector 1436 if applicable, and further processed by a receive processor 1438. The receive processor 1438 may provide decoded data to a data output and to the processor 1440 or memory 1442.

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 1400. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1400.

The following aspects are illustrative only and aspects thereof may be combined with aspects of other embodiments or teaching described herein, without limitation.

Aspect 1 is a method for registering a UAV in a mobile network including transmitting, by the UAV, a request to register with the mobile network, wherein the request includes at least a hardware identifier of the UAV, and receiving, from a component of the mobile network, a response to the request, wherein the response includes a unique UAV identifier, a UAV certificate, and a network certificate generated by at least one of the component of the mobile network or a USS.

In Aspect 2, the method of Aspect 1 includes connecting to the mobile network with a limited access connection to perform registration, wherein transmitting the request and receiving the response are performed over the limited access connection.

In Aspect 3, the method of any of Aspects 1 or 2 includes wherein the hardware identifier of the UAV is signed with a hardware UAV certificate issued by the manufacturer of the UAV.

In Aspect 4, the method of any of Aspects 1 to 3 includes generating a public key and private key pair, wherein the request includes a request to sign the public key and private key pair with the UAV certificate.

In Aspect 5, the method of any of Aspects 1 to 4 includes wherein the response further includes a public and private key pair to be used with the UAV certificate in subsequent communications with the mobile network.

In Aspect 6, the method of any of Aspects 1 to 5 includes wherein transmitting the request is based at least in part on detecting, at the UAV, that mobile network credentials are not stored in a memory of the UAV.

In Aspect 7, the method of any of Aspects 1 to 6 includes wherein transmitting the request is based at least in part on detecting, at the UAV, presence of the UAV in a geographic area outside of a home geographic area defined by the UAV.

In Aspect 8, the method of any of Aspects 1 to 7 includes generating broadcast information to broadcast to one or more other UAVs or a UTM component, wherein the broadcast information includes the UAV identifier and flight information, signing at least the UAV identifier with the UAV certificate, and transmitting the broadcast information to the one or more other UAVs or the UTM component.

In Aspect 9, the method of Aspect 8 includes wherein the response further includes a public key associated with a certificate of a civil agency authority includes signing the flight information with the public key.

In Aspect 10, the method of any of Aspects 8 or 9 includes protecting the UAV identifier with a public key associated with the network certificate.

In Aspect 11, the method of any of Aspects 1 to 10 includes wherein the UAV identifier includes a temporary identifier portion and a routing information portion for identifying the component of the mobile network or the USS.

Aspect 12 is a method for registering a UAV in a mobile network including receiving, from the UAV, a request to register with the mobile network, wherein the request includes at least a hardware identifier of the UAV, and transmitting, to the UAV, a response to the request, wherein the response includes a unique UAV identifier, a UAV certificate, and a network certificate.

In Aspect 13, the method of Aspect 12 includes requesting registration of the UAV with a USS, and receiving a registration response for the UAV from the USS, wherein transmitting the response to the request is based on the registration response.

In Aspect 14, the method of Aspect 13 includes determining the USS based at least in part on the hardware identifier.

In Aspect 15, the method of any of Aspects 13 or 14 includes generating the UAV certificate based on the registration response.

In Aspect 16, the method of any of Aspects 13 to 15 includes generating a public key and private key pair for the UAV based on the registration response, wherein the response to the request further includes the public key and private key pair.

In Aspect 17, the method of any of Aspects 13 to 16 includes signing, based on the registration response, a public key and private key pair received in the request from the UAV.

In Aspect 18, the method of any of Aspects 13 to 17 includes receiving, in the registration response, at least one of the UAV identifier or the UAV certificate.

In Aspect 19, the method of any of Aspects 13 to 18 includes receiving the network certificate from the USS.

In Aspect 20, the method of any of Aspects 12 to 19 includes protecting the response using the network certificate, wherein the network certificate is signed by a civil aviation authority, and wherein the response to the request also includes a public key associated with the civil aviation authority.

In Aspect 21, the method of any of Aspects 12 to 19 includes wherein transmitting the response to the request is based at least in part on verifying the hardware identifier with a component of a home mobile network of the UAV.

Aspect 22 is an apparatus for wireless communication including a memory configured to store instructions, and one or more processors communicatively coupled with the memory, wherein the one or more processors are configured to execute the instructions to perform the operations of one or more methods in any of Aspects 1 to 21.

Aspect 23 is an apparatus for wireless communication including means for performing the operations of one or more methods in any of Aspects 1 to 21.

Aspect 24 is a computer-readable medium including code executable by one or more processors to perform the operations of one or more methods in any of Aspects 1 to 21.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for registering an unmanned aerial vehicle (UAV) in a mobile network, comprising:
   transmitting, by the UAV, a request to register with the mobile network, wherein the request includes at least a hardware identifier of the UAV, wherein the hardware identifier of the UAV enables identification of an unmanned aircraft system service supplier (USS) associated with the UAV, wherein the hardware identifier of the UAV is signed based on a hardware UAV certificate issued by a manufacturer of the UAV;
   receiving, from a component of the mobile network, a response to the request, wherein the response includes a unique UAV identifier, a UAV certificate, and a network certificate generated by at least one of the component of the mobile network or the USS based on the hardware identifier of the UAV; and
   verifying the response based on the network certificate.

2. The method of claim 1, further comprising connecting to the mobile network with a limited access connection to perform registration, wherein transmitting the request and receiving the response are performed over the limited access connection.

3. The method of claim 1, further comprising generating a public key and private key pair, wherein the request includes a request to sign the public key and private key pair based on the UAV certificate.

4. The method of claim 1, wherein the response further includes a public and private key pair to be used with the UAV certificate in subsequent communications with the mobile network.

5. The method of claim 1, wherein transmitting the request is based at least in part on detecting, at the UAV, that mobile network credentials are not stored in a memory of the UAV.

6. The method of claim 1, wherein transmitting the request is based at least in part on detecting, at the UAV, presence of the UAV in a geographic area outside of a home geographic area defined by the UAV.

7. The method of claim 1, further comprising:
   generating broadcast information to broadcast to one or more other UAVs or a UAV traffic management (UTM) component, wherein the broadcast information includes the UAV identifier and flight information;
   signing at least the UAV identifier based on the UAV certificate; and
   transmitting the broadcast information to the one or more other UAVs or the UTM component.

8. The method of claim 7, wherein the response further includes a public key associated with a certificate of a civil agency authority, further comprising signing the flight information with the public key.

9. The method of claim 7, further comprising protecting the UAV identifier with a public key associated with the network certificate.

10. The method of claim 1, wherein the UAV identifier includes a temporary identifier portion and a routing information portion for identifying the component of the mobile network or the USS.

11. A method for registering an unmanned aerial vehicle (UAV) in a mobile network, comprising:
    receiving, from the UAV, a request to register with the mobile network, wherein the request includes at least a hardware identifier of the UAV, wherein the hardware identifier of the UAV is signed based on a hardware UAV certificate issued by a manufacturer of the UAV;
    identifying, based on the hardware identifier, an unmanned aircraft system service supplier (USS) associated with the UAV; and
    transmitting, to the UAV, a response to the request, wherein the response includes a unique UAV identifier, a UAV certificate, and a network certificate generated by at least one of a component of the mobile network or the USS based on the hardware identifier of the UAV.

12. The method of claim 11, further comprising:
    requesting registration of the UAV with an unmanned aircraft system service supplier (USS); and
    receiving a registration response for the UAV from the USS,
    wherein transmitting the response to the request is based on the registration response.

13. The method of claim 12, further comprising generating the UAV certificate based on the registration response.

14. The method of claim 12, further comprising generating a public key and private key pair for the UAV based on the registration response, wherein the response to the request further includes the public key and private key pair.

15. The method of claim 12, further comprising signing, based on the registration response, a public key and private key pair received in the request from the UAV.

16. The method of claim 12, further comprising receiving, in the registration response, at least one of the UAV identifier or the UAV certificate.

17. The method of claim 12, further comprising receiving the network certificate from the USS.

18. The method of claim 11, further comprising protecting the response using the network certificate, wherein the network certificate is signed by a civil aviation authority, and wherein the response to the request also includes a public key associated with the civil aviation authority.

19. The method of claim 11, wherein transmitting the response to the request is based at least in part on verifying the hardware identifier with a component of a home mobile network of the UAV.

20. An apparatus for registering an unmanned aerial vehicle (UAV) in a mobile network, comprising:
a memory configured to store instructions; and
one or more processors communicatively coupled with the memory, wherein the one or more processors are configured to:
transmit a request to register with the mobile network, wherein the request includes at least a hardware identifier of the UAV, wherein the hardware identifier of the UAV enables identification of an unmanned aircraft system service supplier (USS) associated with the UAV, wherein the hardware identifier of the UAV is signed based on a hardware UAV certificate issued by a manufacturer of the UAV;
receive, from a component of the mobile network, a response to the request, wherein the response includes a unique UAV identifier, a UAV certificate, and a network certificate generated by at least one of the component of the mobile network or the USS based on the hardware identifier of the UAV; and
verify the response based on the network certificate.

21. The apparatus of claim 20, wherein the one or more processors are further configured to connect to the mobile network with a limited access connection to perform registration, wherein the one or more processors are configured to transmit the request and receive the response over the limited access connection.

22. The apparatus of claim 20, wherein the one or more processors are further configured to generate a public key and private key pair, wherein the request includes a request to sign the public key and private key pair based on the UAV certificate.

23. The apparatus of claim 20, wherein the response further includes a public and private key pair to be used with the UAV certificate in subsequent communications with the mobile network.

24. The apparatus of claim 20, wherein the one or more processors are configured to transmit the request based at least in part on detecting, at the UAV, that mobile network credentials are not stored in a memory of the UAV.

25. The apparatus of claim 20, wherein the one or more processors are configured to transmit the request based at least in part on detecting, at the UAV, presence of the UAV in a geographic area outside of a home geographic area defined by the UAV.

26. An apparatus for registering an unmanned aerial vehicle (UAV) in a mobile network, comprising:
a memory configured to store instructions; and
one or more processors communicatively coupled with the memory, wherein the one or more processors are configured to:
receive, from the UAV, a request to register with the mobile network, wherein the request includes at least a hardware identifier of the UAV, wherein the hardware identifier of the UAV is signed based on a hardware UAV certificate issued by a manufacturer of the UAV;
identify, based on the hardware identifier, an unmanned aircraft system service supplier (USS) associated with the UAV; and
transmit, to the UAV, a response to the request, wherein the response includes a unique UAV identifier, a UAV certificate, and a network certificate generated by at least one of a component of the mobile network or the USS based on the hardware identifier of the UAV.

27. The apparatus of claim 26, wherein the one or more processors are further configured to:
request registration of the UAV with an unmanned aircraft system service supplier (USS); and
receive a registration response for the UAV from the USS, wherein the one or more processors are configured to transmit the response to the request based on the registration response.

28. The apparatus of claim 27, wherein the one or more processors are further configured to generate the UAV certificate based on the registration response.

29. The apparatus of claim 20, wherein the one or more processors are configured to transmit broadcast information that includes the unique UAV identifier, signed based on the UAV certificate, and wherein at least a portion of the broadcast information is secured based on the network certificate.

30. The apparatus of claim 26, wherein the one or more processors are configured to transmit the response based on authenticating the hardware identifier based on the hardware UAV certificate, and wherein the network certificate is for the UAV to use in securing transmitted broadcast information.

* * * * *